US012268191B2

(12) United States Patent
Farley

(10) Patent No.: US 12,268,191 B2
(45) Date of Patent: *Apr. 8, 2025

(54) ANIMAL TREADWHEEL ASSEMBLY

(71) Applicant: Sean Farley, Camarillo, CA (US)

(72) Inventor: Sean Farley, Camarillo, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/655,549

(22) Filed: Mar. 19, 2022

(65) Prior Publication Data

US 2022/0295747 A1  Sep. 22, 2022

Related U.S. Application Data

(63) Continuation of application No. 16/245,903, filed on Jan. 11, 2019, now Pat. No. 11,304,406, which is a continuation-in-part of application No. 14/697,877, filed on Apr. 28, 2015, now Pat. No. 10,182,555.

(60) Provisional application No. 62/023,806, filed on Jul. 11, 2014.

(51) Int. Cl.
*A01K 15/02* (2006.01)
(52) U.S. Cl.
CPC .................................. *A01K 15/027* (2013.01)
(58) Field of Classification Search
USPC ....... 119/700, 702, 703, 704, 712; D30/160; 472/16, 26, 44; 482/54, 78; 273/143 R, 273/142 R; 446/124, 236
See application file for complete search history.

(56) References Cited

U.S. PATENT DOCUMENTS

| 724,672 | A | | 4/1903 | Culver | |
|---|---|---|---|---|---|
| 883,485 | A | | 3/1908 | Ridgway | |
| 916,009 | A | * | 3/1909 | Plummer | ............... B60B 25/02 301/99 |
| 1,264,738 | A | | 4/1918 | Woolard | |
| 1,467,852 | A | | 9/1923 | Hall | |
| 1,500,917 | A | | 7/1924 | Bell | |
| 1,521,133 | A | | 12/1924 | Tinker | |
| 1,733,972 | A | | 10/1929 | Miller | |
| 2,001,205 | A | | 5/1935 | Otto | |
| 2,660,457 | A | * | 11/1953 | Mallon | ................... A47L 9/244 285/402 |
| 2,681,638 | A | | 6/1954 | Carvell | |

(Continued)

FOREIGN PATENT DOCUMENTS

JP  3059726 U * 7/1999 ............. B60B 21/00

*Primary Examiner* — Andrea M Valenti
(74) *Attorney, Agent, or Firm* — Orbit IP, LLP; Marc G. Martino

(57) ABSTRACT

An animal treadwheel includes a plurality of platforms, each having a curved surface opposite a bottom side, a first end opposite a second end and a left side opposite a right side. The curved surface is delimited by the first end, left side, second end and right side. A platform extension is disposed at the first end and a platform recess is disposed at the second end. A left curved roller surface is disposed at the left side and a right curved roller surface is disposed at the right side. The platform extension of one platform attaches to the platform recess of an adjacent platform in a repeatable manner. Accordingly, a singular and continuous cylindrical inner surface is formed from the plurality of curved surfaces and a singular and continuous cylindrical left and right outer surface is formed from the plurality of left and right curved roller surfaces.

18 Claims, 17 Drawing Sheets

(56) References Cited

U.S. PATENT DOCUMENTS

| | | | |
|---|---|---|---|
| 3,464,718 A * | 9/1969 | Fisher | A63B 19/02 |
| | | | 280/206 |
| 3,536,324 A | 10/1970 | Ahrens | |
| 3,537,726 A | 11/1970 | Conover | |
| 3,934,291 A | 1/1976 | Hagen | |
| 4,389,047 A | 6/1983 | Hall | |
| 4,621,815 A | 11/1986 | Yamamoto | |
| 4,938,540 A | 7/1990 | Sacks | |
| 5,125,361 A | 6/1992 | Rowlands | |
| 6,074,305 A * | 6/2000 | Schnapp | A63B 19/02 |
| | | | 280/206 |
| 6,299,010 B1 | 10/2001 | Hsu | |
| 6,500,097 B1 * | 12/2002 | Hall | A63B 19/04 |
| | | | 482/69 |
| D484,284 S | 12/2003 | Venson | |
| 6,740,009 B1 * | 5/2004 | Hall | A63B 19/04 |
| | | | 482/69 |
| 7,288,849 B1 | 10/2007 | Chiang | |
| D689,154 S | 9/2013 | Seo | |
| 9,314,682 B2 | 4/2016 | Baek | |
| 2004/0020090 A1 | 2/2004 | Lueddecke | |
| 2010/0242357 A1 * | 9/2010 | Vogler | A01G 9/28 |
| | | | 47/33 |
| 2011/0124468 A1 | 5/2011 | Incerti Fornaciari | |
| 2011/0214614 A1 | 9/2011 | Sharp | |
| 2014/0145497 A1 | 5/2014 | Chang | |

* cited by examiner

ANIMAL TREADWHEEL ASSEMBLY

CROSS-REFERENCE TO RELATED APPLICATIONS

This continuation application claims priority to the continuation-in-part application Ser. No. 16/245,903 filed on Jan. 11, 2019, which itself claimed priority to the non-provisional application Ser. No. 14/697,877 filed on Apr. 28, 2015, which itself claimed priority to provisional application 62/023,806 filed on Jul. 11, 2014, the entire contents of all applications are hereby incorporated in full by these references.

DESCRIPTION

Field of the Invention

The present invention generally relates to treadwheels. More particularly, the present invention relates to a treadwheel for an animal that can be assembled with a plurality of simple different parts and without the need for tools.

Background of the Invention

Animal treadwheels for medium-sized pets such as dogs and cats have been taught in the prior art. However, these treadwheels are usually hard to assemble or manufacture. Furthermore, these treadwheels can be very large in size such that the shipping methods and costs are unduly burdensome and expensive for the end user or purchaser.

Accordingly, a need exists for a treadwheel that can be assembled by the end user in an easy manner which doesn't require tools. Also, a need exists for the treadwheel to ship in a more compact manner. Therefore, the cost and expense of manufacturing and shipping the treadwheel can be reduced such that more people are able to purchase and use the treadwheel.

SUMMARY OF THE INVENTION

An embodiment of an animal treadwheel assembly 10 comprises a plurality of platforms 12. Each platform comprises: a curved (concave) surface 14 opposite a bottom side 16; a first end 18 opposite a second end 20; a left side 22 opposite a right side 24; wherein the first and second ends are connected by the left and right sides; wherein the curved surface is delimited by the first end, left side, second end, and right side; at least one left side extension 222 extending outwardly from the left side in a direction away from the right side; at least one right side extension 224 extending outwardly from the right side in a direction away from the left side. A plurality of elongated curved connectors 44 are manufactured as a separate part from the plurality of platforms, each elongated curved connector comprising: a curved (concave) upper surface 50 opposite a curved (convex) bottom surface 52; an outside end 46 opposite an inside end 48; a first connector end 54 opposite a second connector end 56; wherein the outside end is contiguous to the curved upper surface; wherein the curved upper surface is contiguous with the inside end; wherein the inside end is contiguous with the curved bottom surface; wherein the curved bottom surface is contiguous with the outside end; wherein the first connector end and the second connector end are delimited by the outside end, the curved upper surface, the inside end and the curved bottom surface; at least one platform extension receiver 226 integrally formed along the inside end, the at least one platform extension receiver configured to receive either the at least one left or the at least one right side extension of each platform; a connector extension 62 integrally formed as part of the elongated curved connector at the first connector end, the connector extension extending outwardly in a (arcuate) direction generally away from the second connector end; a connector recess 64 integrally formed as part of the elongated curved connector at the second connector end, the connector recess extending inwardly in a (arcuate) direction generally towards the first connector end. The first end of one platform is configured to be disposed adjacent to the second end of an adjacent platform in a repeatable manner where the plurality of platforms are configured to form a singular and continuous cylindrical surface from the plurality of curved surfaces. The connector extension of one connector is configured to be inserted into and directly connectable to the connector recess of an adjacent connector in a repeatable manner forming a fixed connection. The plurality of connectors are configured to form two singular and continuous rings. The plurality of the at least one left side extensions of the plurality of platforms are connectable to the plurality of the at least one platform extension receivers of one of the two singular and continuous rings. The plurality of the at least one right side extensions of the plurality of platforms are connectable to the plurality of the at least one platform extension receivers of the other of the two singular and continuous rings. Each singular and continuous ring is directly attachable to the singular and continuous cylindrical surface of the plurality of platforms forming a self-supporting rigid cylindrical treadwheel 10. A stationary base configured to rest upon a surface, the stationary base supporting a plurality of rollers, where the plurality of rollers are configured to roll against the plurality of curved bottom surfaces allowing the self-supporting rigid cylindrical treadwheel to spin freely when an animal moves upon the singular and continuous cylindrical surface.

In other exemplary embodiments, they may include a plurality of biased locks, wherein the plurality of biased locks are configured to fixedly attach the plurality of elongated curved connectors to one another forming the two singular and continuous rings, and wherein the plurality of biased locks are also configured to fixedly attach the two singular and continuous rings to the singular and continuous cylindrical surface of the plurality of platforms thereby forming the self-supporting rigid cylindrical treadwheel. The plurality of biased locks may each be manufactured as a separate part from the plurality of elongated curved connectors and the plurality of platforms. Each biased lock of the plurality of biased locks may comprise a flexural spring portion attached to an extended button. The flexural spring portion and extended button may be integrally formed as an injection molded polymer part.

The connector extension may comprise an integrally formed first buttonhole and the connector recess comprises an integrally formed second buttonhole, the first and second buttonholes configured to align together when the connector extension of the one elongated curved connector is inserted into the connector recess of the adjacent elongated curved connector.

At least one of the biased locks of the plurality of biased locks may be configured to be disposed within the connector extension. The at least one biased lock may fixedly attach two adjacent elongated curved connectors when the extended button is disposed within the aligned first and second buttonholes.

The first and second buttonholes may be disposed along the inside end of each of the plurality of elongated curved connectors.

Each elongated curved connector may comprise an integrally formed third buttonhole and each platform comprises an integrally formed fourth buttonhole. The third buttonhole and fourth buttonhole may be configured to align together when either of the two singular and continuous rings are attached to the singular and continuous cylindrical surface of the plurality of platforms. At least one of the biased locks of the plurality of biased locks may be configured to fixedly attach the either of the two singular and continuous rings to the singular and continuous cylindrical surface of the plurality of platforms when the extended button is disposed within the aligned third and fourth buttonholes.

The plurality of biased locks may comprise a spring attached to an extended button.

Each of the plurality of biased locks may be integrally formed as either a part of each elongated curved connector or as a part of each platform, wherein each biased lock comprises a flexural spring portion attached to an extended button.

A lip edge 66 may project from and along the entirety of the curved bottom surface in a direction away from the curved upper surface, wherein the lip edge is configured to be disposed adjacent to the plurality of rollers when the self-supporting rigid cylindrical treadwheel is placed upon the stationary base.

A plurality of pads 42 may be configured to attach to the entirety of the curved surface.

Each platform of the plurality of platforms may consist of a single part of an injection molded plastic, and each elongated curved connector of the plurality of elongated curved connectors may consist of a single part of an injection molded plastic.

A platform extension 36 may be integrally formed at the first end of each of the plurality of platforms, and a platform recess 38 may be integrally formed at the second end of each of the plurality of platforms, wherein the platform extension of the one platform may be configured to be connectable to the platform recess of the adjacent platform in a repeatable manner.

The connector extension may be configured to assemble and attach into the connector recess in a movement direction that is generally along the arcuate shape of the elongated curved connector.

Each singular and continuous ring may be configured to assemble and attach to the plurality of platforms in a movement direction that is perpendicular to the left side and right side of the platforms. When formed as the self-supporting rigid cylindrical treadwheel, the abutting ends of the plurality of platforms may be staggered in relation to the abutting ends of the plurality of elongated curved connectors.

The plurality of platforms may consist of eight platforms. The plurality of elongated curved connectors for each of the singular and continuous rings may consist of eight elongated curved connectors.

Another exemplary embodiment of the animal treadwheel assembly may comprise: a plurality of curved platforms each manufactured as a single injection molded part, wherein a first end of one platform is configured to be disposed adjacent to a second end of an adjacent platform in a repeatable manner wherein the plurality of platforms are configured to form a singular and continuous cylindrical surface; a plurality of elongated curved connectors manufactured as a single injection molded part, each elongated curved connector having a first connector end disposed opposite a second connector end, wherein the first connector end of one elongated curved connector is fixedly connectable to the second connector end of an adjacent elongate curved connector in a repeatable manner forming a left side and right side self-supporting rigid and continuous ring; wherein the left side and right side self-supporting rigid and continuous rings are fixedly connectable to the singular and continuous cylindrical surface forming a self-supporting rigid cylindrical treadwheel; and a stationary base configured to rest upon a surface, the stationary base supporting a plurality of rollers, where the plurality of rollers are configured to roll against the self-supporting rigid cylindrical treadwheel allowing the self-supporting rigid cylindrical treadwheel to spin freely when an animal moves within.

Another previous embodiment of an animal treadwheel assembly includes a plurality of platforms. Each platform includes: a curved surface opposite a bottom side; a first end opposite a second end; a left side opposite a right side; wherein the first and second ends are connected by the left and right sides; wherein the curved surface is delimited by the first end, left side, second end, and right side; an upper right-side edge formed along the right side concentric to the curved surface; a lower right-side edge formed along the right side concentric to the upper right-side edge; an upper left side edge formed along the left side concentric to the curved surface; a lower left side edge formed along the left side concentric to the upper left side edge. The treadwheel assembly also includes a plurality of elongated curved connectors. Each connector includes: an outside end opposite an inside end; a curved upper surface opposite a curved bottom surface; a first connector end opposite a second connector end; wherein the outside end is contiguous to the curved upper surface; wherein the curved upper surface is contiguous with the inside end; wherein the inside end is contiguous with the curved bottom surface; wherein the curved bottom surface is contiguous with the outside end; wherein the first connector end and second connector end are delimited by the outside end, curved upper surface, inside end and curved bottom surface; a first catch formed at the inside end near the curved upper surface; a second catch formed at the inside end near the curved bottom surface; a connector extension formed at the first connector end; a connector recess formed at the second connector end. The first end of one platform is configured to be connectable to the second end of an adjacent platform in a repeatable manner where the plurality of platforms are configured to form a singular and continuous cylindrical surface from the plurality of curved surfaces. The connector extension of one connector is configured to be connectable to the connector recess of an adjacent connector in a repeatable manner where the plurality of connectors are configured to form two singular and continuous rings. Each singular and continuous ring is attachable to the cylindrical and continuous cylindrical surface forming a self-supporting rigid cylindrical treadwheel, where the plurality of first catches connect to the plurality of upper side edges and where the plurality of second catches connect to the plurality of lower side edges. A stationary base is configured to rest upon a surface, the stationary base supporting a plurality of rollers, where the plurality of rollers are configured to roll against the plurality of curved bottom surfaces allowing the self-supporting rigid cylindrical treadwheel to spin freely when an animal moves upon the singular and continuous cylindrical surface.

In other embodiments, a lip edge may project from and along the entirety of the curved bottom surface.

The treadwheel may include a plurality of pads, each pad configured to attach to the entirety of the curved surface.

The curved surface may be concave in shape.

The self-supporting rigid cylindrical treadwheel may be void of auxiliary fasteners.

The platform may consist of a single part of plastic injection molded plastic. The connector may consist of a single part of plastic injection molded plastic.

A platform extension may be formed at the first end, and a platform recess formed at the second end, wherein the platform extension of the one platform is configured to be connectable to the platform recess of the adjacent platform in a repeatable manner for the plurality platforms. The platform extension may be configured to assemble into the platform recess in a movement direction that is generally perpendicular to adjacent first and second ends. The connector extension may be configured to assemble into the connector recess in a movement direction that is generally perpendicular to the outside and inside ends.

Each singular and continuous ring may be configured to assemble to the plurality of platforms in a movement direction that is perpendicular to the left side and right side of the platforms.

The self-supporting rigid cylindrical treadwheel may be formed where the abutting ends of the plurality of platforms are staggered in relation to the abutting ends of the plurality of elongated curved connectors.

The plurality of platforms may comprise at least eight platforms. The plurality of elongated curved connectors may comprise at least sixteen connectors.

An embodiment of an animal treadwheel assembly includes a plurality of identically shaped platforms. Each platform comprises a curved surface delimited by a first end, left side, second end and right side, where the left side is opposite the right side and the first end is opposite the second end. The treadwheel includes a plurality of identically shaped elongated curved connectors. Each connector comprises: a first connector end opposite a second connector end; where the connector ends are delimited by a curved upper surface, an outside end, a curved bottom surface and an inside end, where the outside end is opposite the inside end and where the curved upper surface is opposite the curved bottom surface; a connector extension formed at the first connector end; and a connector recess formed at the second connector end. The first end of one platform is configured to be connectable to a second end of an adjacent platform in a repeatable manner where the plurality of platforms are configured to form a singular and continuous cylindrical structure. The connector extension of one connector is configured to be connectable to a connector recess of an adjacent connector in a repeatable manner where the plurality of connectors are configured to form a first singular and continuous ring and a second singular and continuous ring. The first ring is configured to be attached to the right side of the cylindrical structure and the second ring is configured to be attached to the left side of the cylindrical structure forming a self-supporting rigid cylindrical treadwheel. A stationary base configured to rest upon a surface, the stationary base supporting a plurality of rollers, where the plurality of rollers are configured to roll against the plurality of curved bottom surfaces allowing the self-supporting rigid cylindrical treadwheel to spin freely when an animal moves within the treadwheel.

An embodiment of a self-supporting rigid cylindrical treadwheel consists of a plurality of identically shaped platforms each having a curved surface, wherein a first end of one platform is configured to be connectable to a second end of an adjacent platform in a repeatable manner where the plurality of platforms are configured to form a singular and continuous cylindrical structure. The treadwheel also consists of a plurality of identically shaped elongated curved connectors, wherein a connector extension of one connector is configured to be connectable to a connector recess of an adjacent connector in a repeatable manner where the plurality of connectors are configured to form a first singular and continuous ring and a second singular and continuous ring. The first ring is configured to be attached to a right side of the cylindrical structure and the second ring is configured to be attached to a left side of the cylindrical structure.

An embodiment of an animal treadwheel assembly comprises a self-supporting rigid cylindrical treadwheel consisting of a plurality of identically shaped platforms each having a curved surface, wherein a first end of one platform is configured to be connectable to a second end of an adjacent platform in a repeatable manner where the plurality of platforms are configured to form a singular and continuous cylindrical structure forming the self-supporting rigid cylindrical treadwheel. A stationary base is configured to rest upon a surface, the stationary base supporting a plurality of rollers above the surface, where the plurality of rollers are configured to rotatably support the treadwheel to spin freely when an animal moves within the self-supporting rigid cylindrical treadwheel.

BRIEF DESCRIPTION OF THE DRAWINGS

The accompanying drawings illustrate the invention. In such drawings.

DETAILED DESCRIPTION OF THE PREFERRED EMBODIMENTS

Figure 2:
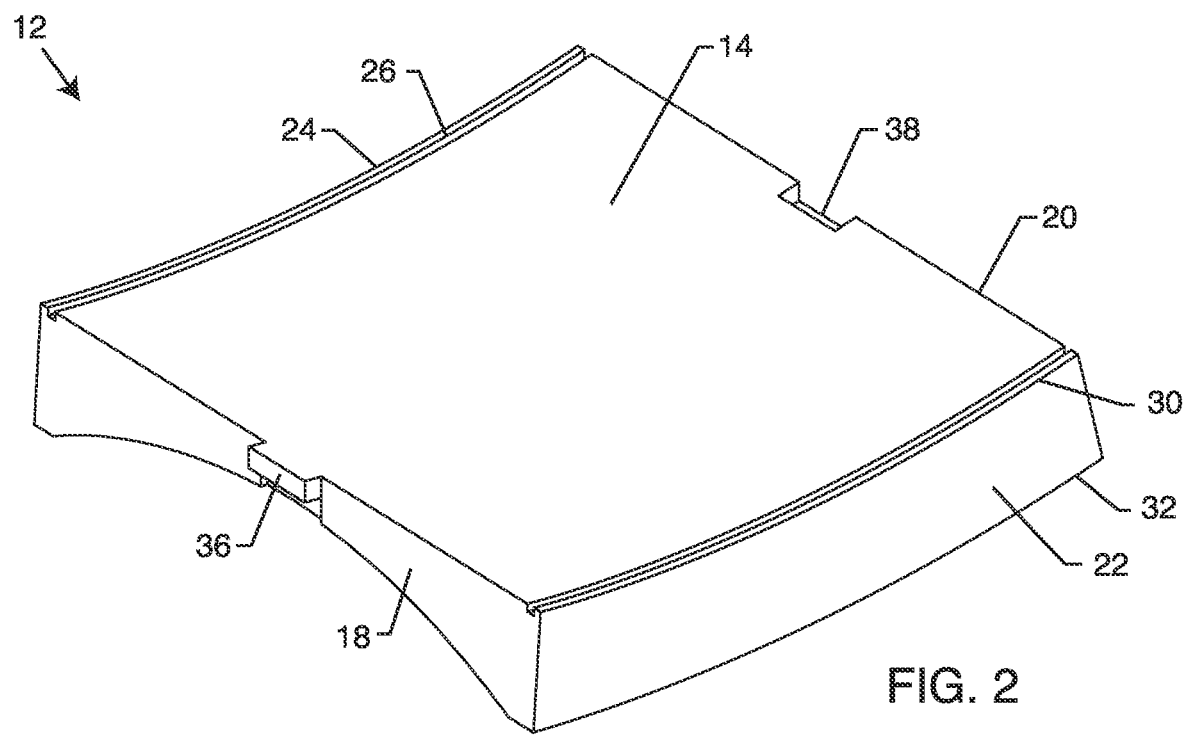
FIG. 2 is a top perspective view of an exemplary platform from the animal treadwheel assembly of FIG. 1.
Figure 3:
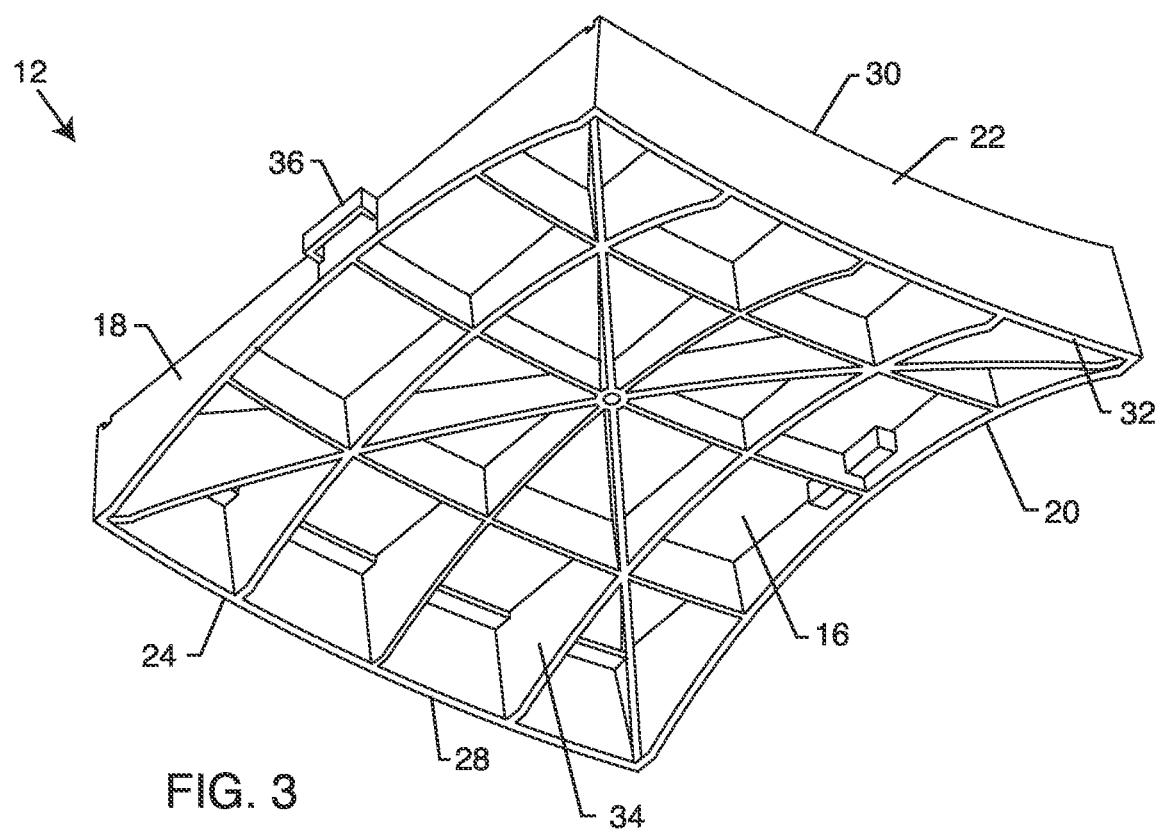
FIG. 3 is a bottom perspective view of the platform of FIG. 2.

An animal treadwheel assembly 10 includes a plurality of platforms 12. The platforms 12 are best seen in FIGS. 2 and 3. Each platform 12 has a curved surface 14 opposite a bottom side 16, a first end 18 opposite a second end 20, and a left side 22 opposite a right side 24. The first end 18 and second end 20 are connected by the left side 22 and right side 24. The curved surface 14 is delimited by the first end 18, left side 22, second end 20, and right side 24. (Delimited means that it determines the limits or boundaries thereof.) An upper right-side edge 26 is formed along the right side 24 concentric to the curved surface 14. (Concentric means of or denoting circles, arcs, or other shapes that share the same center, the larger often completely surrounding the smaller.) A lower right-side edge 28 is formed along the right side 24 concentric to the upper right-side edge 26 or the curved surface 14. An upper left side edge 30 is formed along the left side 22 concentric to the curved surface 14. A lower left side edge 32 is formed along the left side concentric to the upper left side edge 30 or the curved surface 14.

As can be seen in the figures, the curved surface 14 is concentric in shape, such that when each individual platform 12 forms a part of the inside of the treadwheel structure 40. The curved surface 14 is also a substantially continuous surface which is free of major apertures or holes. This aids in the animal being able to traverse upon any portion of the curved surface 14. Opposite the curved surface 14 is the bottom side 16. The bottom side 16 has a plurality of strengthening ribs 34 formed therein. The strengthening ribs 34 provide substantial inherent stiffness and rigidity for the final assembly of the treadwheel structure 40.

As shown in FIGS. 2 and 3, each platform may have a platform extension 36 formed at the first end 18, and a platform recess 38 formed at the second end 20. The platform extension 36 of the one platform is configured to be connectable to the platform recess 38 of the adjacent platform in a repeatable manner for the plurality platforms 12. The platform extension 36 nesting and connecting within the platform recess 38 helps to align each platform 12 relative to an adjacent platform 12 when forming the treadwheel structure 40. The platform extension 36 can be a variety of connecting shapes that are received by the inverse shape of the platform recess 38. As shown herein, the platform extension 36 is configured to assemble into the platform recess 38 in a movement direction that is generally perpendicular to adjacent first 18 and second ends 20.

One skilled in the art will also understand that the platform 12 can be made as an injection molded part. The platform 12 can be constructed as shown such that it can be made in a simple two-part mold where two halves of a mold can be pulled apart to expose and retrieve the platform 12. In other words, the entirety of each platform 12 may consists of a single part of plastic injection molded plastic. In another embodiment not shown, the platform 12 could be made as a vacuum formed part or from a sheet of plastic that is flex bent into outer rims. As can be appreciated, many manufacturing methods may be used to make the platform 12 or equivalent structures.

Figure 4:
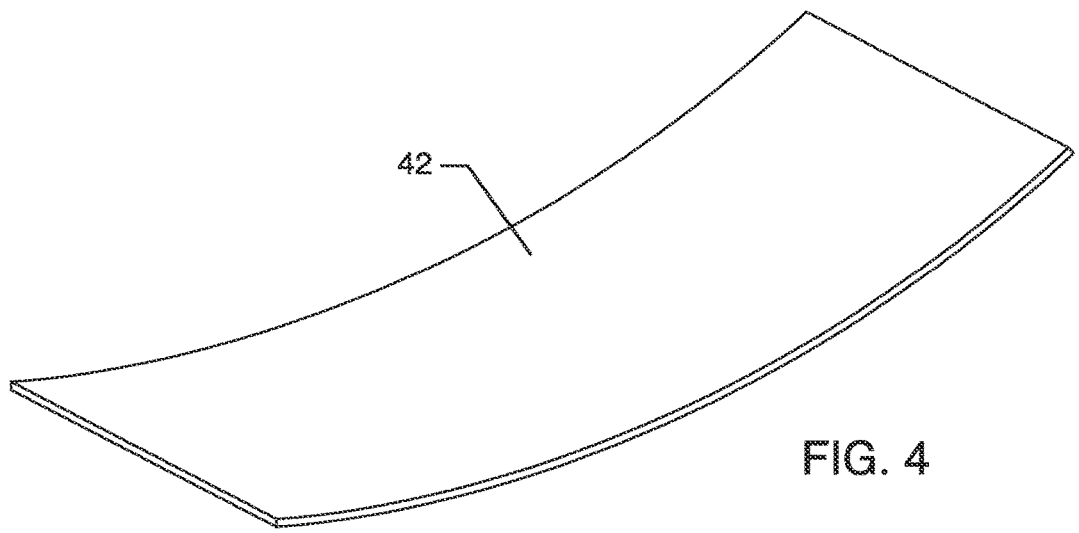
FIG. 4 is a top perspective view of an exemplary pad from the animal treadwheel assembly of FIG. 1.
Figure 5:
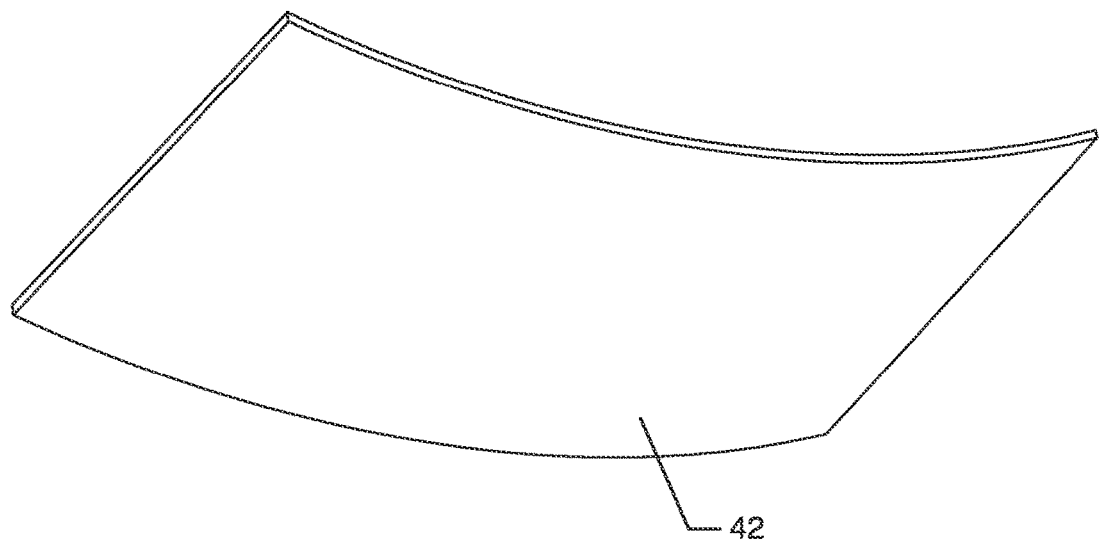
FIG. 5 is a bottom perspective view of the pad of FIG. 4.
Figure 6:
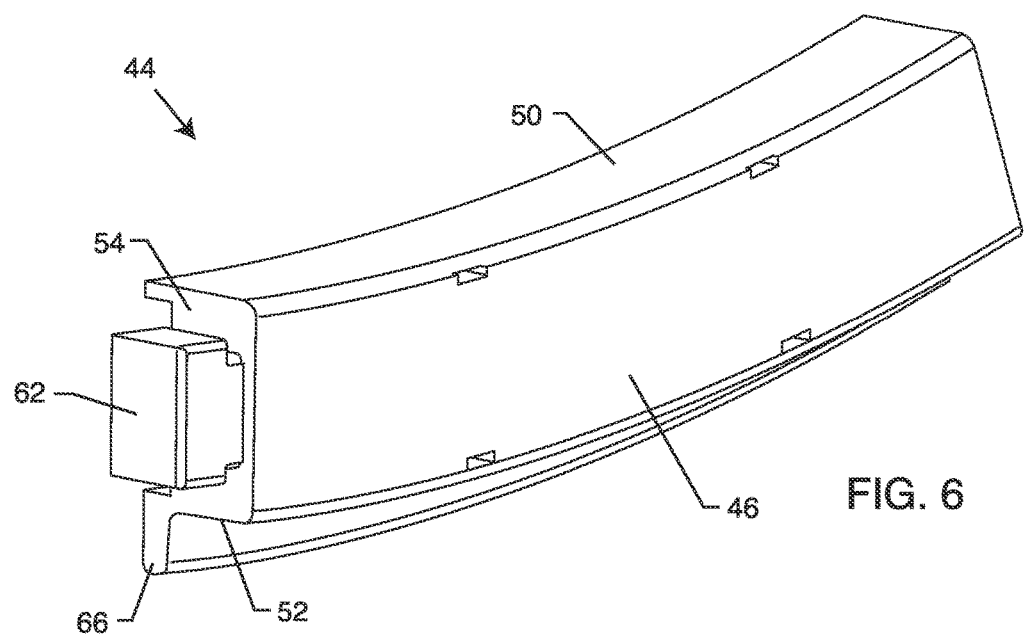
FIG. 6 is an outside perspective view of an exemplary connector from the animal treadwheel assembly of FIG. 1.
Figure 7:
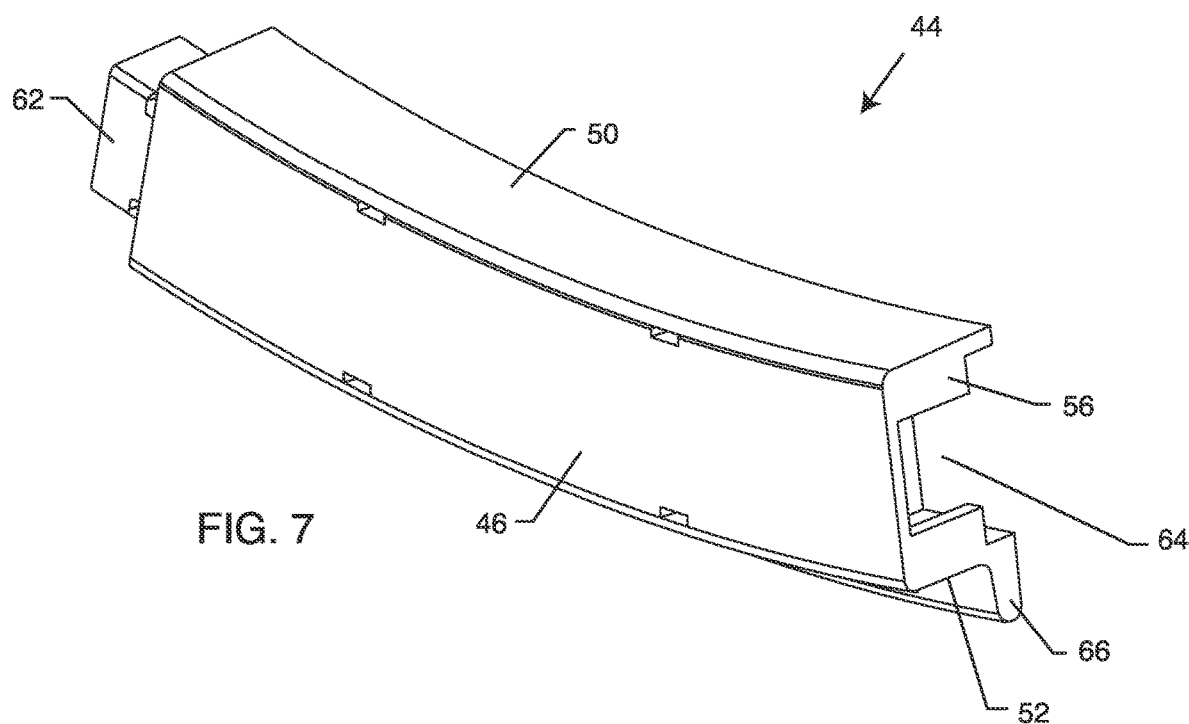
FIG. 7 is another outside perspective view of the connector of FIG. 6.
Figure 8:
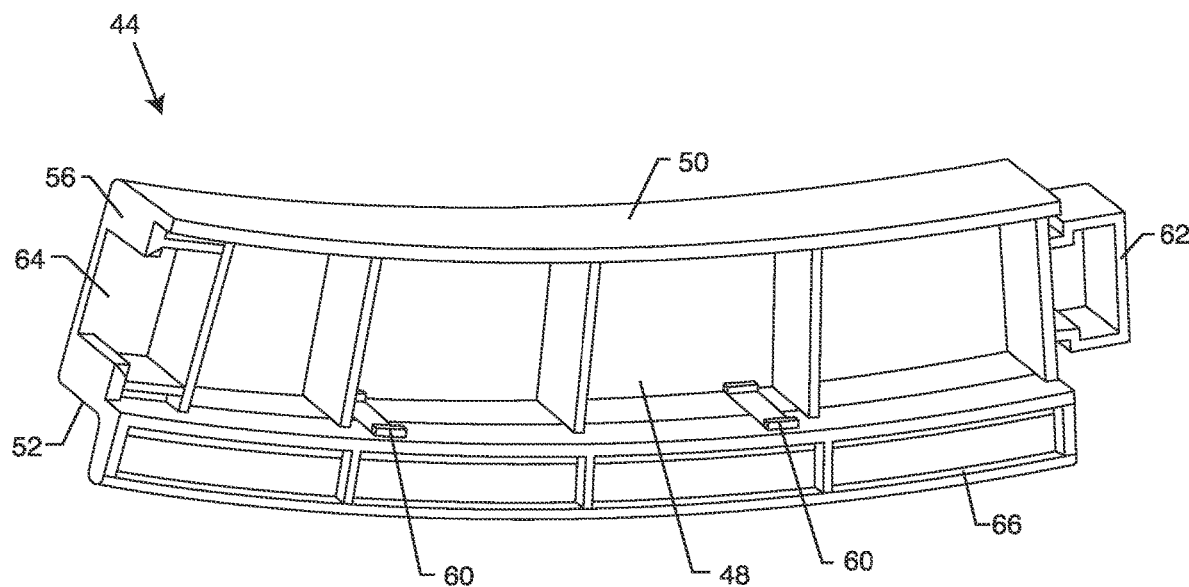
FIG. 8 is an inside perspective view of the connector of FIG. 6.
Figure 9:
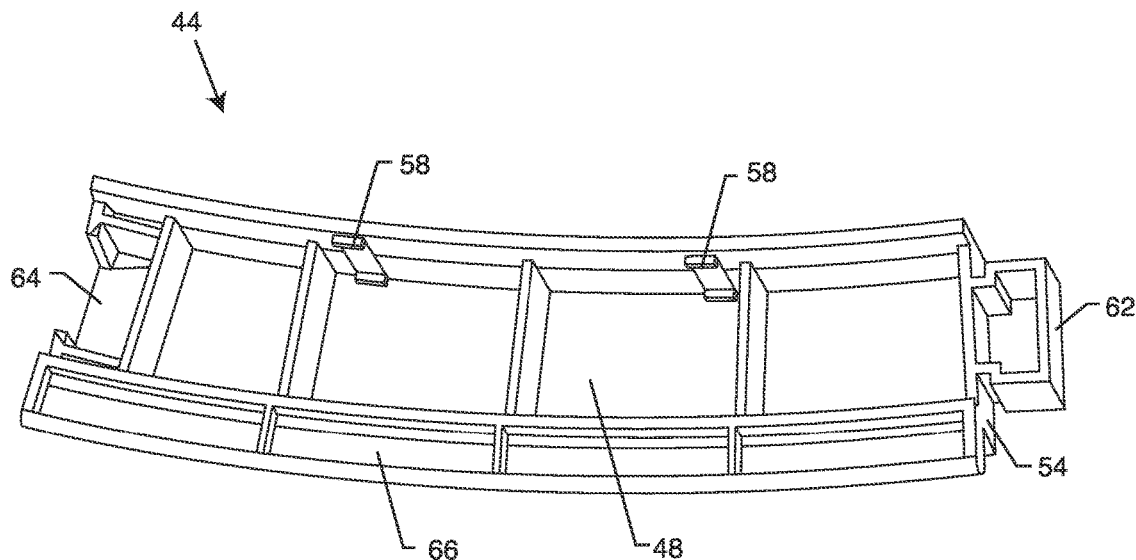
FIG. 9 is another inside perspective view of the connector of FIG. 6.
Figure 10:
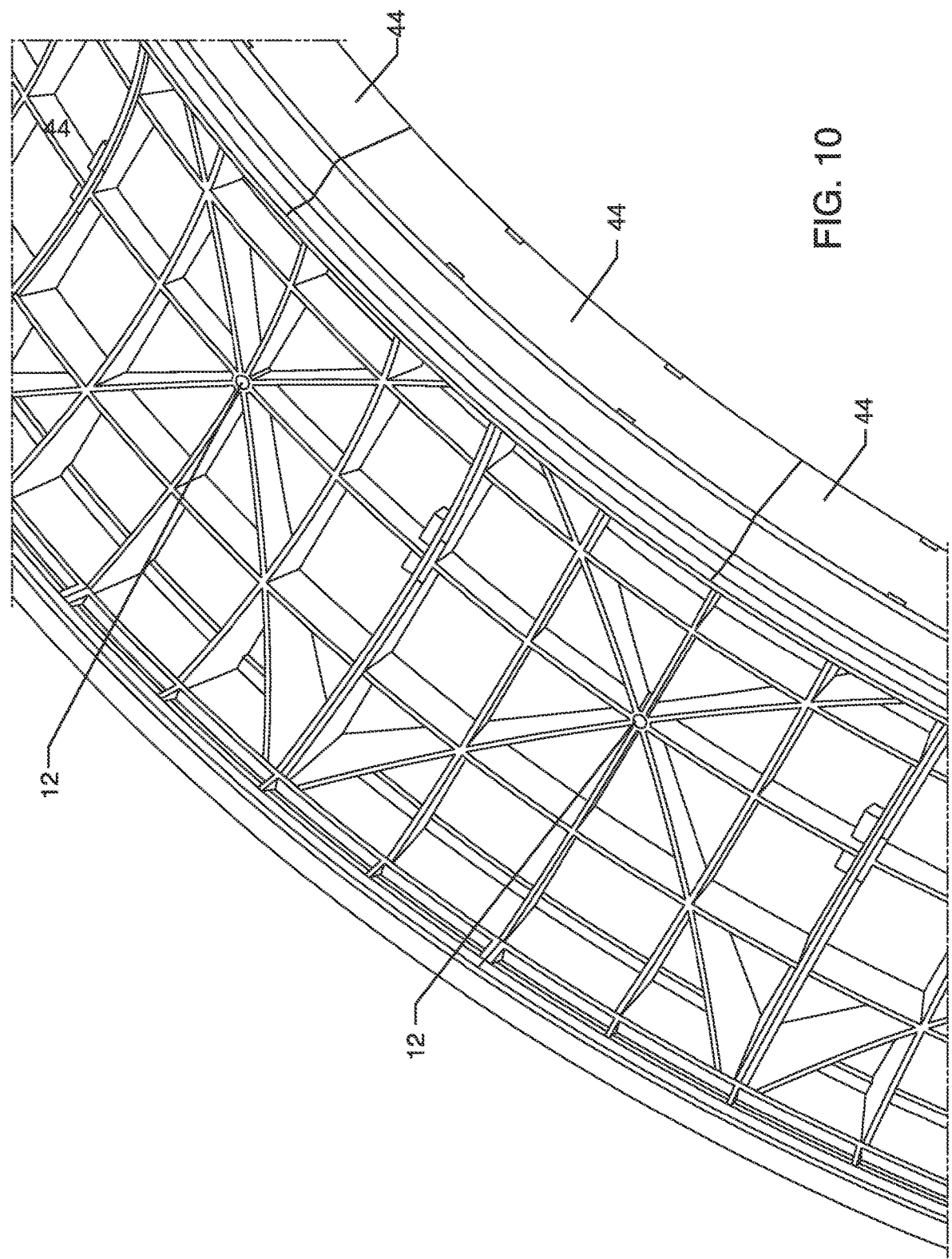
FIG. 10 is an enlarged perspective view of the animal treadwheel of FIG. 1.

FIGS. 4 and 5 show a pad 42 that could be placed upon the curved surface 14 of the platform 12. The pad 42 may have a bottom adhesive surface that bonds to the curved surface 14. The pads 42 may also be resilient in form such that the pad 42 provides some added level of shock absorption and cushion for the animal walking upon the pad 42. The pad 42 may also incorporate a traction-enhanced surface to increase the animals grip when walking thereon. The pad 14 may be made from a resilient foam or rubber compound or the like.

FIGS. 6-9 show an elongated curved connector 44. Each connector 44 includes an outside end 46 opposite an inside end 48, a curved upper surface 50 opposite a curved bottom surface 52, and a first connector end 54 opposite a second connector end 56. As shown herein, the outside end 46 is contiguous to the curved upper surface 50, the curved upper surface 50 is contiguous with the inside end 48, the inside end 48 is contiguous with the curved bottom surface 52, and the curved bottom surface 52 is contiguous with the outside end 46. (Contiguous means sharing a common border; i.e. touching.) The first connector end 54 and second connector end 56 are delimited by the outside end 46, curved upper surface 50, inside end 48 and curved bottom surface 52.

A first catch 58 (also appropriately named as a grip, nub, or latch) is formed at the inside end 48 near the curved upper surface 50. A second catch 60 formed at the inside end near 48 the curved bottom surface 52. The catch 58/60 may be one catch or a plurality of catches.

A connector extension 62 is formed at the first connector end 54 and a connector recess 64 is formed at the second connector end 56. The connector extension 62 is match formed with the connector recess 64 such that one securely fits and nests within the other. In this way a plurality of connectors 44 can attach to one another. In these embodiments the connector extension 62 is configured to assemble into the connector recess 64 in a movement direction that is generally perpendicular to the outside end 46 and inside end 48.

The connector 44 also may include a lip 66 edge projecting from and along the entirety of the curved bottom surface 52. The lip 66 is used to help keep the treadwheel structure 40 aligned onto various rollers when in use.

One skilled in the art will also understand that the connector 44 may be made of a single part of plastic injection molded plastic. Furthermore, the connector 44 may be made from a simple two-part mold where two halves of a mold can be pulled apart to expose and retrieve the connector 44. In other words, the entirety of each connector 44 may consist of a single part of a plastic injection molded plastic.

The treadwheel structure 40 is comprised of a plurality of platforms 12 connected to one another wherein the first end 18 of one platform 12 is configured to be connectable to the second end 20 of an adjacent platform 12 in a repeatable manner where the plurality of platforms 12 are configured to form a singular and continuous cylindrical surface from the plurality of curved surfaces 14.

Then, the plurality of connectors 44 are connected to one another, wherein the connector extension 62 of one connector 44 is configured to be connectable to the connector recess 64 of an adjacent connector 12 in a repeatable manner where the plurality of connectors 44 are configured to form two singular and continuous rings.

Then each singular and continuous ring of connectors 44 is attachable to the cylindrical and continuous cylindrical surface forming a self-supporting rigid cylindrical treadwheel 40. Each plurality of connectors 44 from the singular and continuous rings are configured to assemble to the plurality of platforms 12 in a movement direction that is perpendicular to the left side 22 and right side 24 of the platforms 12. More specifically, the first catch 58 of each connector 44 secures to the upper right-side edge 26 or upper left side edge 30 of the platforms 12. Then the second catch 60 secures to the lower right-side edge 28 or lower left side edge 32 of the platforms 12.

The treadwheel structure 40 is essentially formed from just two different parts, the platform 12 and the connector 44. The plurality of platforms 12 may comprise at least four or eight platforms 12 and the plurality of elongated curved connectors 44 may comprise at least eight or sixteen connectors. In this manner, the treadwheel assembly 40 is a self-supporting rigid cylindrical treadwheel 40 that is void of auxiliary fasteners, meaning it can be assembled by hand without the need of auxiliary tools or other fasteners. As can be seen, the number of platforms 12 and connectors 44 may vary more or less than as taught and still be consistent with the structure taught herein.

Figure 12:
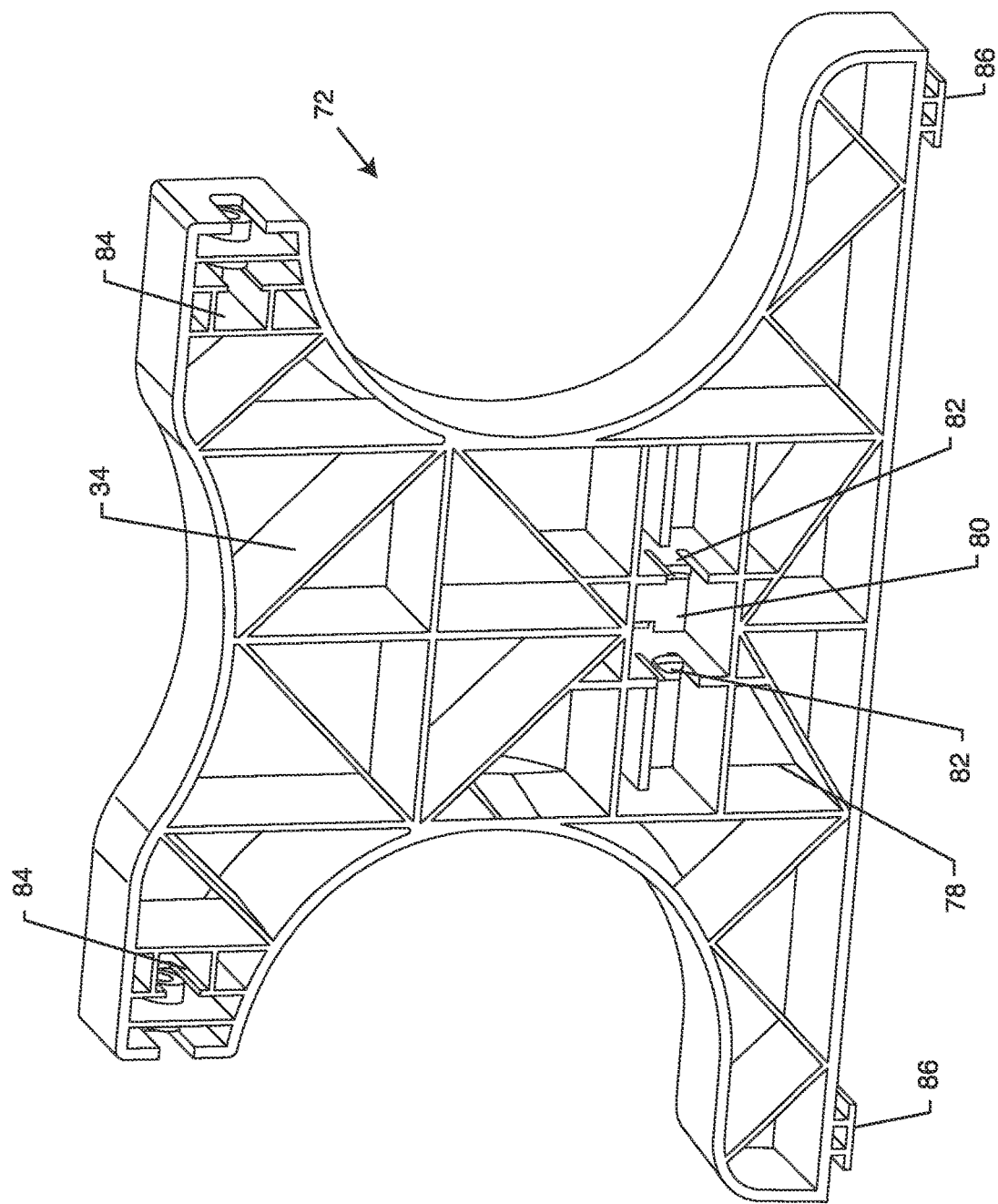
FIG. 12 is an inside perspective view of a roller support from the roller assembly base of FIG. 11.

As best shown in FIG. 12, when formed as the self-supporting rigid cylindrical treadwheel 40 the abutting ends of the plurality of platforms 12 may be staggered in relation to the abutting ends of the plurality of elongated curved connectors 44. In this way the abutting ends of the platforms 12 do not align with the abutting ends of the connectors 44. In this manner, the rigidity of the treadwheel structure 40 is aided by the inherent rigidity of the platform 12 part and connector 44 part.

Figure 1:
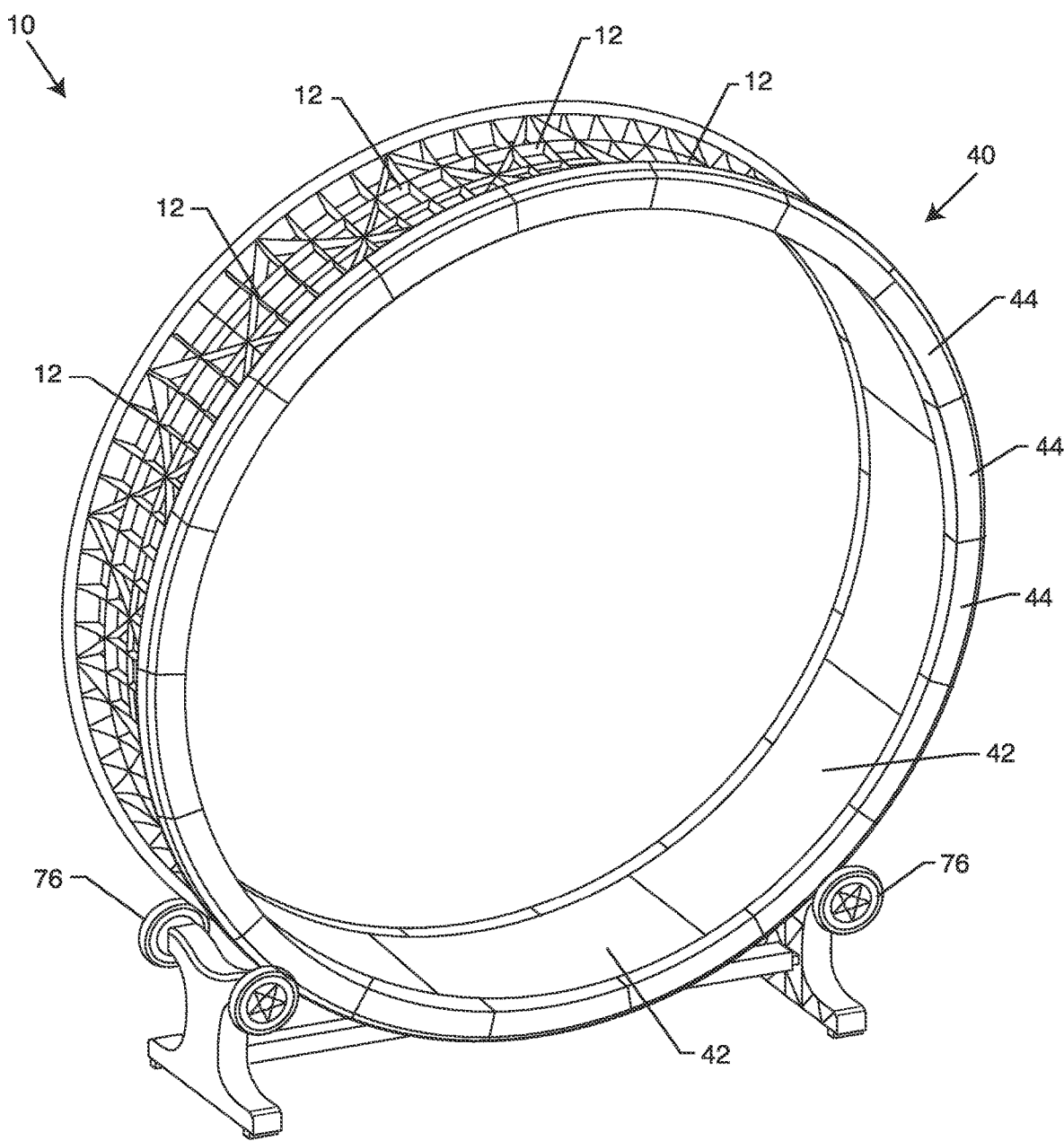
FIG. 1 is a perspective view of an exemplary embodiment of an animal treadwheel assembly.
Figure 11:
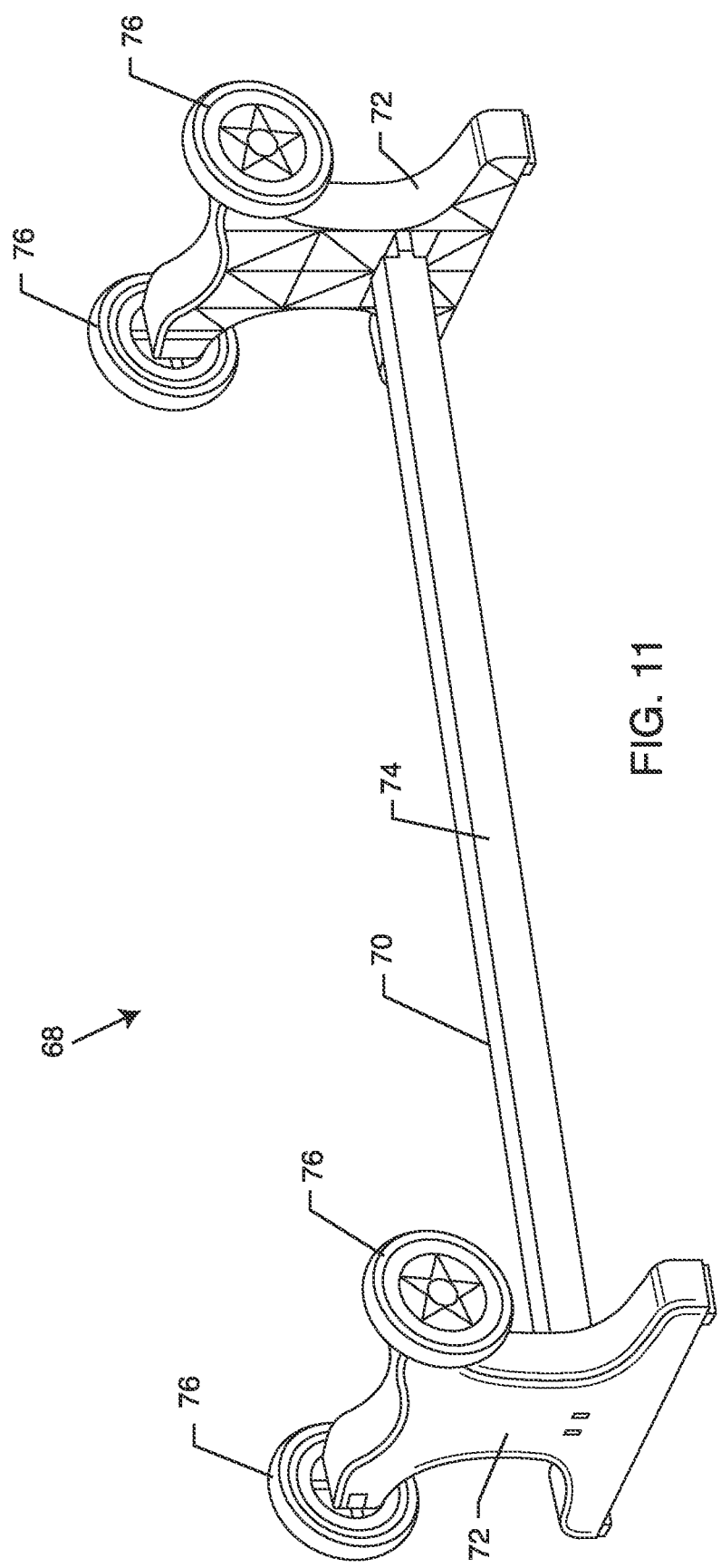
FIG. 11 is a perspective view of an exemplary roller assembly base from the structure of FIG. 1.
Figure 13:
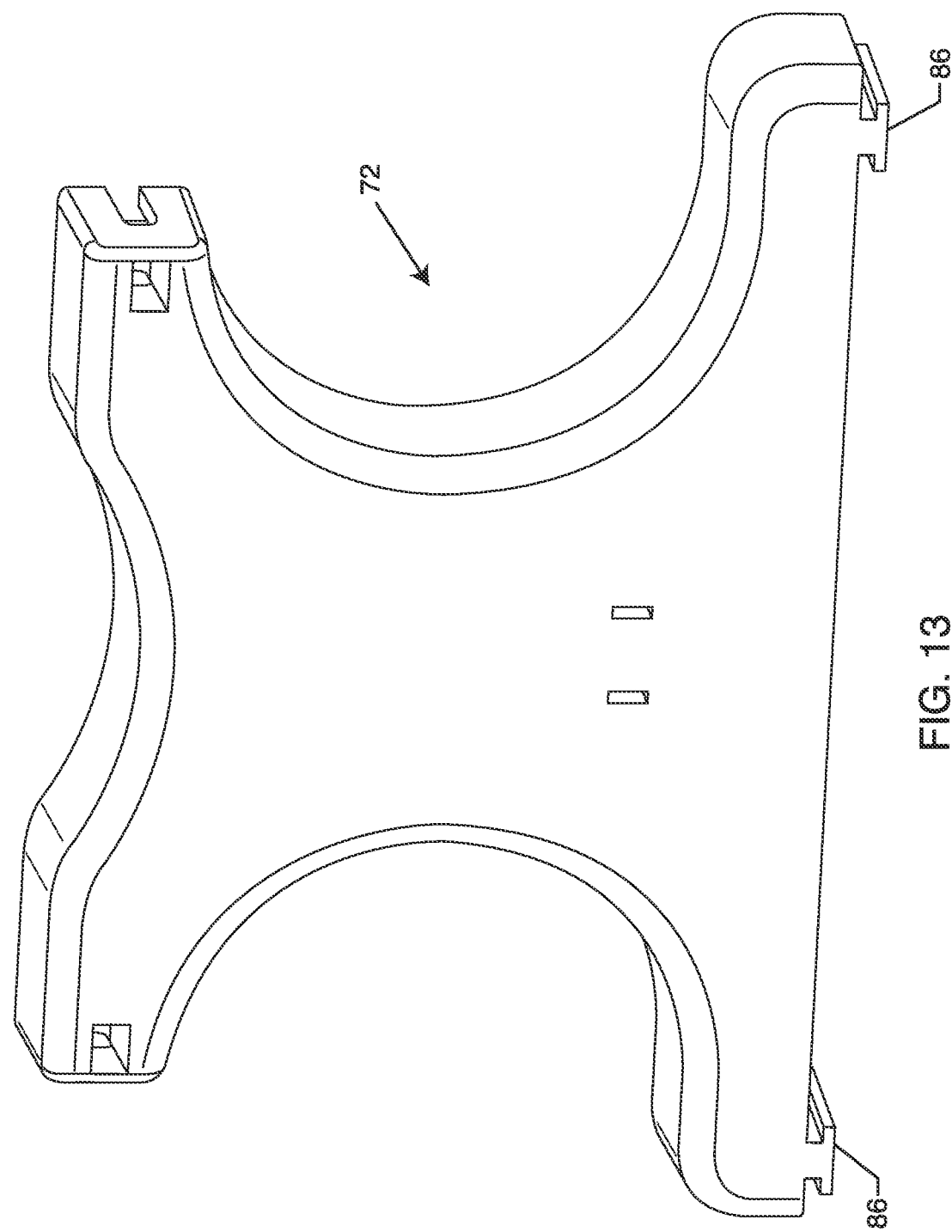
FIG. 13 is an outside perspective view of the roller support from FIG. 12.
Figure 14:
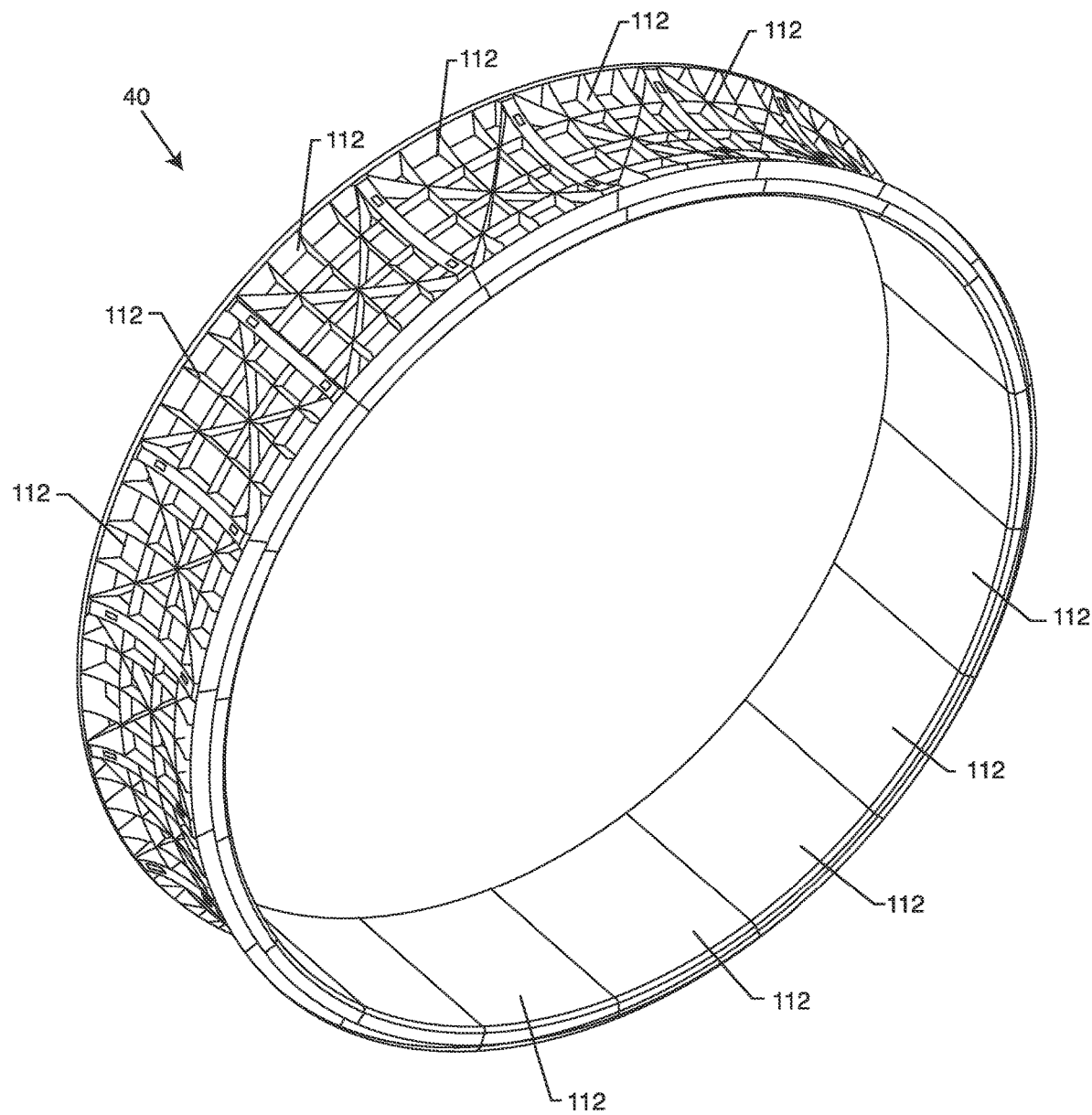
FIG. 14 is a perspective view of another exemplary embodiment of an animal treadwheel that only consists of platforms.
Figure 15:
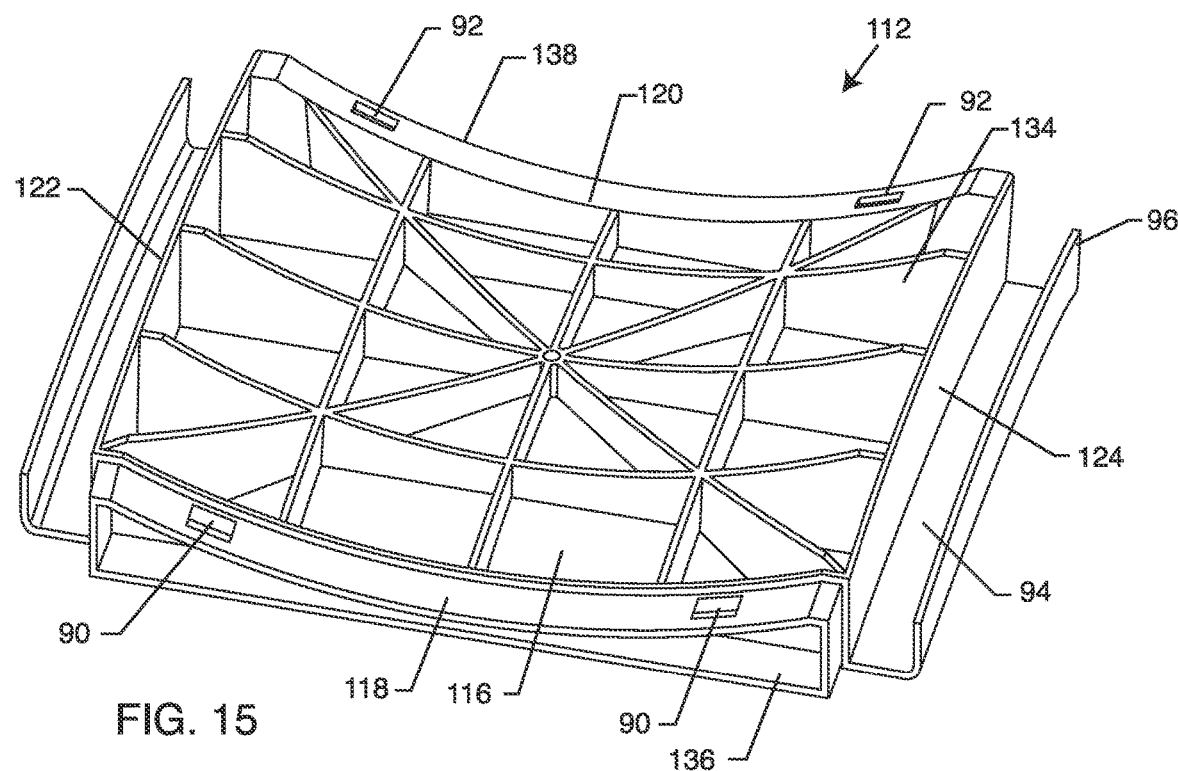
FIG. 15 is a bottom perspective view of the platform from FIG. 14.
Figure 16:
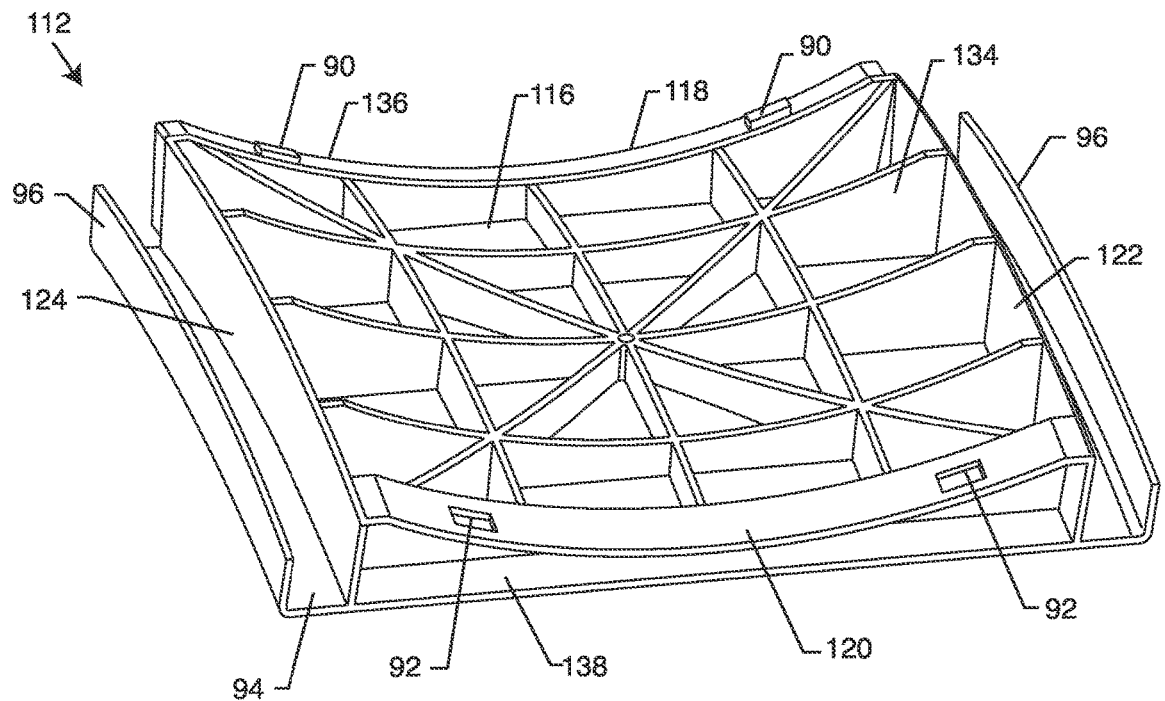
FIG. 16 is another bottom perspective view of the platform of FIG. 15.
Figure 17:
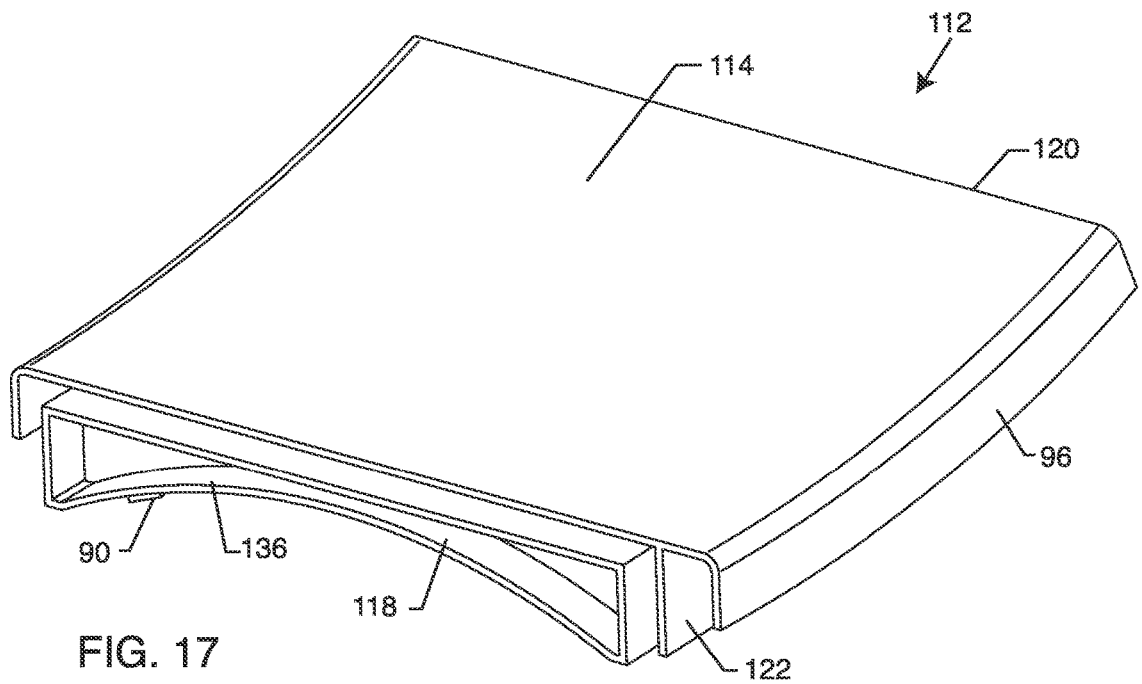
FIG. 17 is a top perspective view of the platform of FIG. 15.
Figure 18:
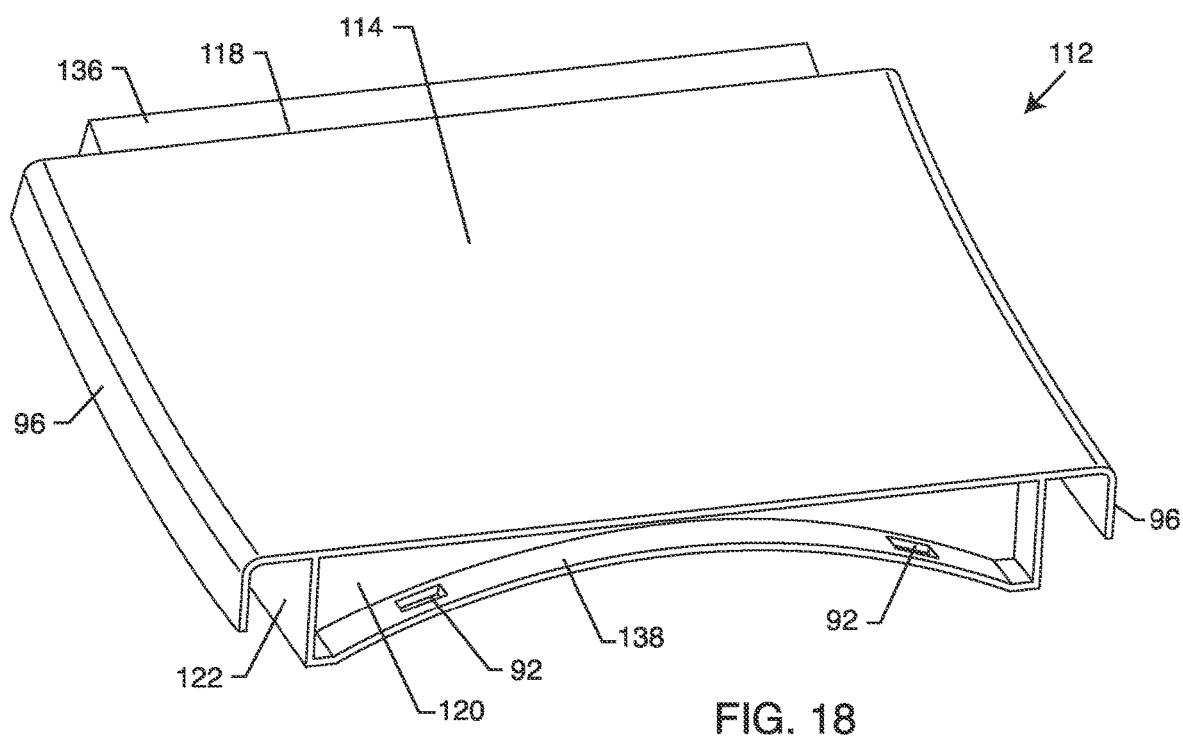
FIG. 18 is another top perspective view of the platform of FIG. 15.

Now referring to FIGS. 11-13, a roller assembly 68 is comprised of a stationary base 70 configured to rest upon a surface. The stationary base 70 is comprised of two roller supports 72 connected by an extension part 74. Each roller support 72 is configured to support two rollers 76, where the rollers 76 are configured to rotate freely such that the rollers 76 support the treadwheel structure 40 thereon as shown in FIG. 1.

Each roller support 72 can be made as an injection molded plastic part from a two-part mold. On an inside 78 of the roller support 72 is an extension part receptacle 80. The extension part receptacle 80 is configured to accept an end of the extension part 74. The extension part receptacle 80 can include flexure tabs 84 that catch a hole or aperture formed in the ends of the extension part 74. The extension part 74 can be made as an extrusion, where the extrusion can have a cross-section that is square, rectangular, circular, oval or any other acceptable structural shape.

Each roller support 72 can also have nut capture features 84 molded therein. The nut capture feature 84 is used to secure/lock a nut from rotating once it is placed inside the nut capture feature 84. This is accomplished by sizing the inside of the nut capture feature 84 to be the same size as a particular nut. Then a roller 76 can easily be attached from the outside by taking a threaded fastener and going through a roller bearing of the roller 76 and fastening the fastener into the nut thereby securing the roller 76 to the roller support 72.

Each roller support 72 can also have a bottom extension 86 configured to receive and attach a rubber standoff or pedestal, such that the roller assembly 68 can rest upon a surface by using the rubber standoff or pedestal. In this way, increased grip can be achieved between the roller assembly 68 and the surface it is resting upon.

Each roller support 72 can also include a plurality of internal ribs 34 to give it increased stiffness and strength.

FIGS. 14-18 are of another embodiment of a treadwheel structure 40. Here, there are only platforms 112; eighteen platforms 112 to be exact. The platforms 112 connect to one another without the need for connectors 44, but could use connectors as shown herein throughout. The platforms 112 still have the curved surface 114. The curved surface 114 is opposite the bottom side 116. Each platform 112 has a first end 118 opposite a second end 120, and a left side 122 opposite a right side 124.

In these embodiments, a platform extension 136 from one platform 112 is configured to lock into the platform recess 138 of an adjacent platform 112. Tabs 90 are configured to lock into apertures 92. Each platform 112 can also include strengthening ribs 134 to provide increased rigidity and strength.

Each platform 112 also has a roller surface 94 with a lip 96. The lip 96 can also be described as a raised edge. The roller surface 94 is similar in functioning to the curved bottom surface 52 of the connectors 44. The roller surface 94 allows the rollers 76 to roll upon thereby supporting the treadwheel structure 40 in a rotatably free manner. The lips 96 help to keep the treadwheel structure 40 on the rollers 76 the same way the lip 66 of the connector 44 did.

In the embodiment of FIGS. 14-18 the same platform 112 may be used to create a treadwheel structure 40 that doesn't use any auxiliary fasteners and can be assembled by hand quickly and efficiently. Additionally, the animal treadwheel consists essentially of the plurality of platforms and does not need additional structural parts to be attached contrary to the embodiments in FIGS. 1-10 and 19-30. However, fasteners (FIGS. 26-29) may or may not be used to attach the plurality of platforms together.

A major advantage of the embodiments disclosed herein is that the structures can be packaged unassembled such that they encompass a much smaller volume than they would if the animal treadwheel assembly 10 was shipped assembled. In this manner significantly reduced shipping expenses can be gained while still providing an easy to assembly structure. Another advantage of the embodiments disclosed herein is that the treadwheel structure 40 can be assembled by a person without the need for tools or fasteners. The plurality of platforms 12 and connectors 44 can simply be pushed and snapped together through the inherent fastening means built into the platforms 12 and connector 44.

The inventor has manufactured and sold animal treadwheels for many years. One major lesson learned was that some customers had a hard time assembling the previous versions of the animal treadwheel. This was because the animal treadwheel required a higher than desired level of skill and strength to snap the various parts together that some customers could not accomplish. For example, many customers could be older in age and lack the physical strength and skill needed for assembly. Therefore, the inventor wanted to improve on the previous design such that the new embodiments discussed herein are easier to assemble as they require less skill and less strength for ease of assembly.

Figure 19:
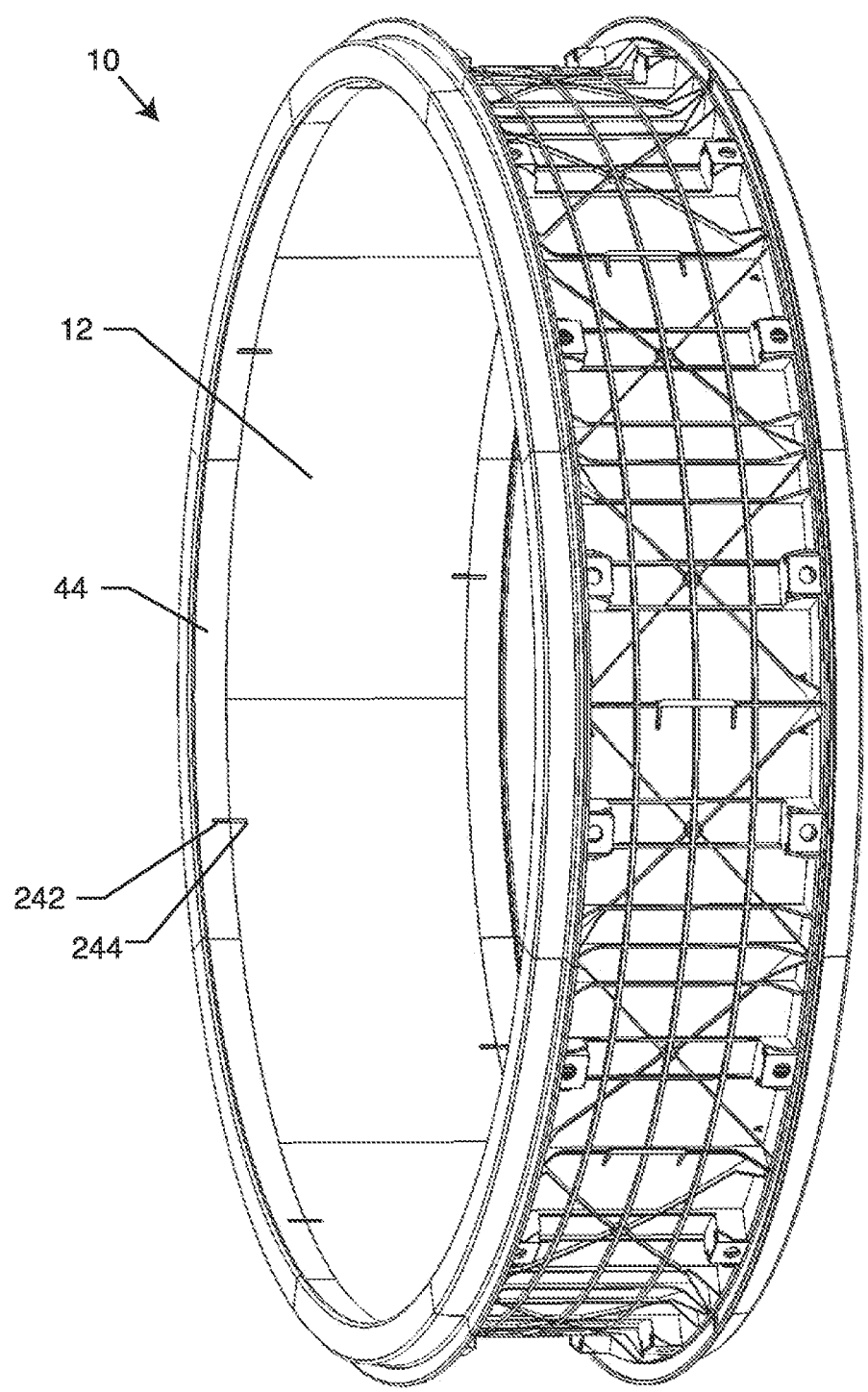
FIG. 19 is a perspective view of a new embodiment of an animal treadwheel of the present invention.

Referring now to FIG. 19, a new embodiment of an animal treadwheel assembly 10 is disclosed. Many of the features of this new embodiment are similar to the previous design, and accordingly similar numerals are used herein for features that are similar. Accordingly, much of the previous discussion is applicable to this new embodiment and is not repeated herein for brevity.

Figure 20:
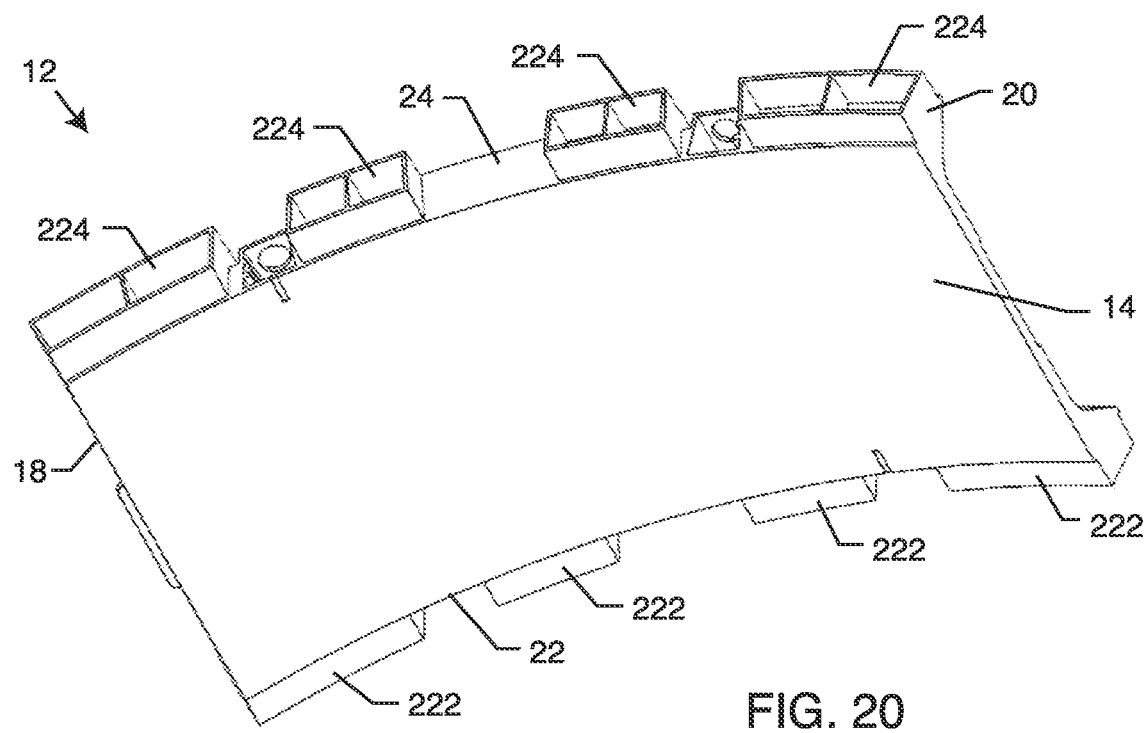
FIG. 20 is a perspective view of an exemplary embodiment of a platform of the structure of FIG. 19.
Figure 21:
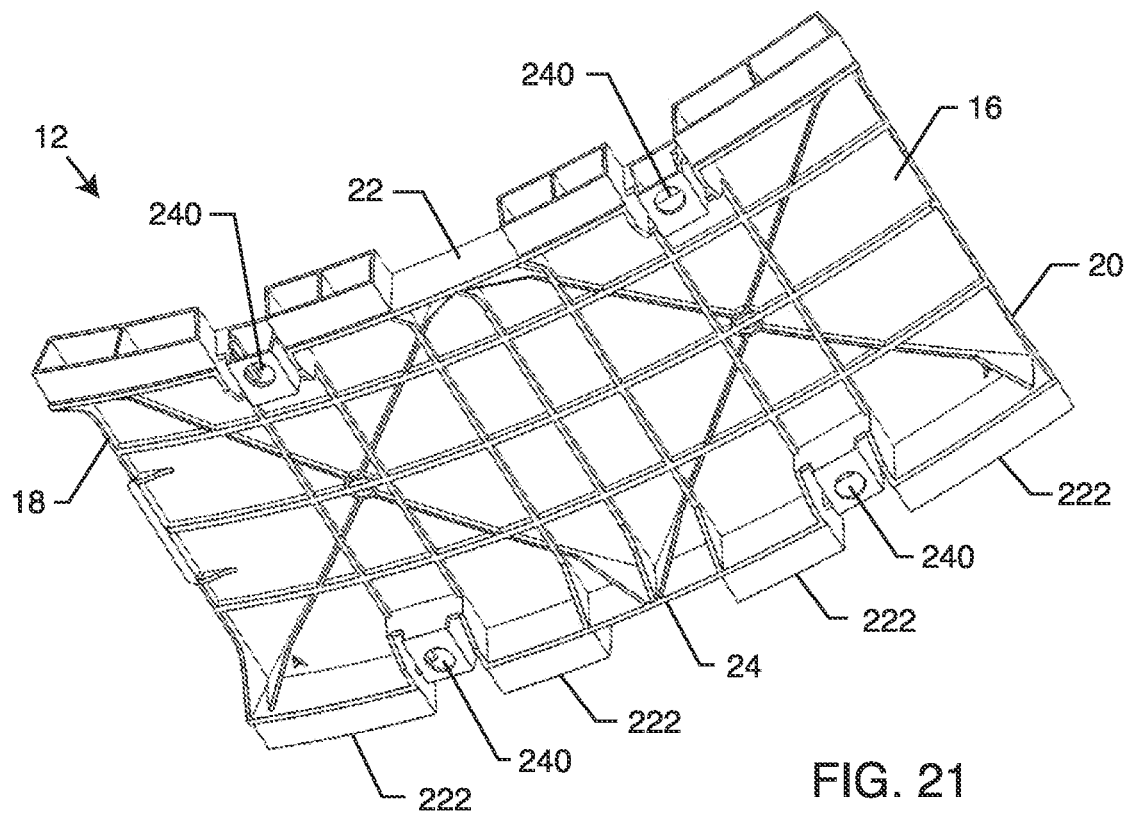
FIG. 21 is another perspective view of the platform of FIG. 20.

Referring to FIGS. 20 and 21, a plurality of platforms 12 are disclosed. Each platform comprises a curved (concave, inside) surface 14 opposite a bottom (convex, outside) side 16. To define the platform, a first end 18 is opposite a second end 20 and a left side 22 is opposite a right side 24. The first and second ends are connected by the left and right sides. The curved surface is delimited by the first end, the left side, the second end, and the right side.

As can be seen in FIGS. 20 and 21, at least one left side extension 222 extends outwardly from the left side in a direction away from the right side, and similarly at least one right side extension 224 extends outwardly from the right side in a direction away from the left side. As can be seen, each side generally has four extensions 222 and 224 extending outwardly. However, it will be understood that the extensions could have been one, two, three, five or any other number of extensions. The extensions 222 and 224 are integrally formed as part of each platform 14, as the platform is an injection molded part made of a polymer. It will be understood to those skilled in the art that the extensions can take many shapes and sizes, as the extensions do not have to be limited to the exact designs shown herein. Rather, the purpose of the extensions are to fixedly lock to the connectors 44 (as discussed below) such that movement between the parts is eliminated for a secure attachment.

Referring now to FIGS. 22-25, a plurality of elongated curved connectors 44 are manufactured as a separate part from the plurality of platforms. Again, each elongated curved connector 44 is an injection molded part typically made of a polymer. Each elongated curved connector comprises a curved (concave, inside) upper surface 50 opposite a curved (convex, outside) bottom surface 52. To define the connectors, an outside end 46 is opposite an inside end 48 and a first connector end 54 is opposite a second connector end 56. The outside end is contiguous to the curved upper surface, the curved upper surface is contiguous with the inside end, the inside end is contiguous with the curved bottom surface and the curved bottom surface is contiguous with the outside end. Furthermore, the first connector end and the second connector end are delimited by the outside end, the curved upper surface, the inside end and the curved bottom surface.

Figure 22:
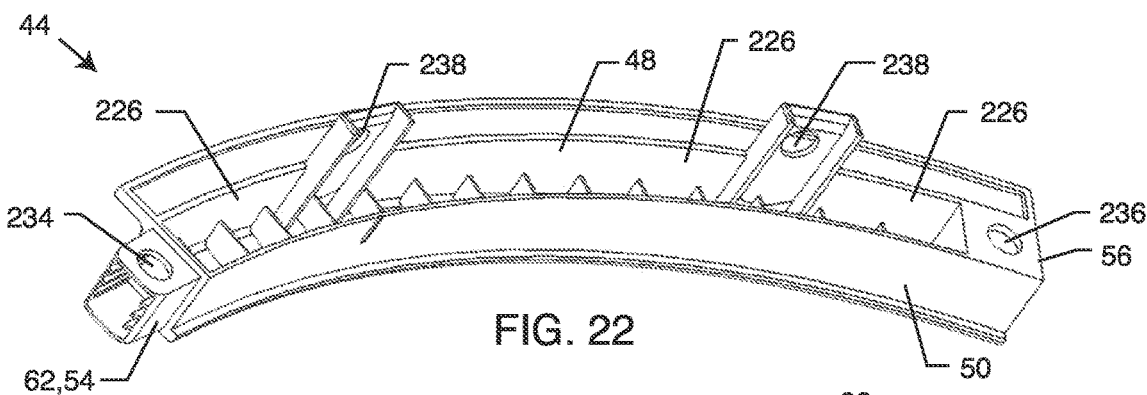
FIG. 22 is a perspective view of an exemplary elongated curved connector of the structure of FIG. 19.
Figure 23:
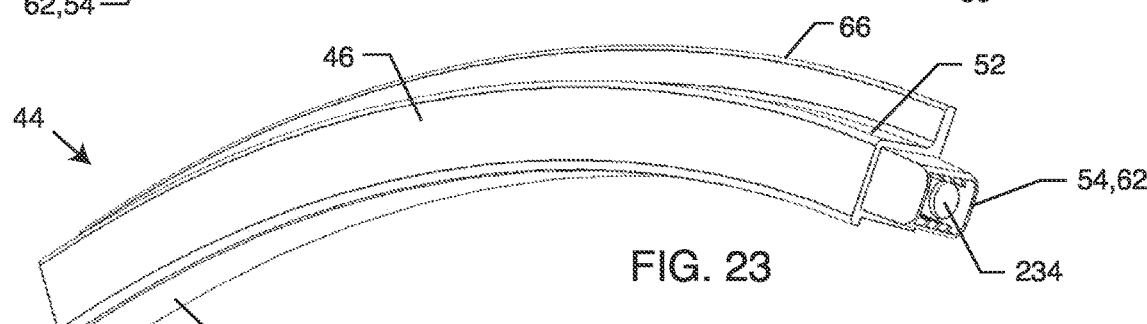
FIG. 23 is another perspective of the connector of FIG. 22.
Figure 24:
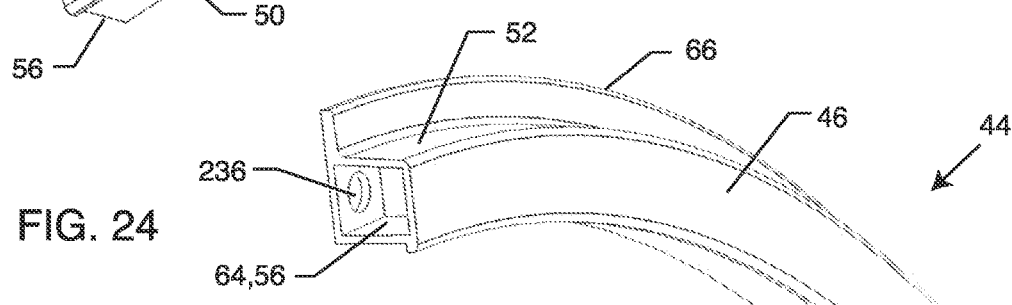
FIG. 24 is another perspective of the connector of FIG. 22.
Figure 25:
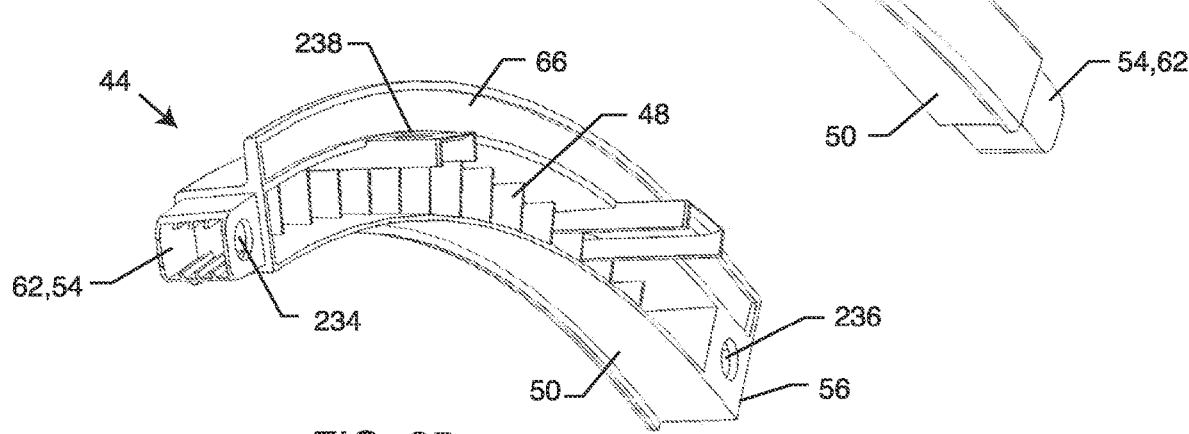
FIG. 25 is another perspective of the connector of FIG. 22.

Best seen in FIGS. 22 and 25, the connector 44 includes at least one platform extension receiver 226 integrally formed along the inside end. The platform extension receiver 226 can be one continuous opening as shown here are segmented into different portions. It will be understood to those skilled in the art that the receivers 225 and 226 can take many shapes and sizes, as this teaching is not limited to the exact embodiment shown herein. What is important is that the at least one platform extension receiver is configured to receive either the at least one left or the at least one right side extension of each platform for a secure attachment. This means that the extensions 222 and 224 are designed to fit snugly within the receivers 226 such that movements between parts is eliminated.

Additionally on each connector 44, a connector extension 62 is also integrally formed as part of the elongated curved connector at the first connector end. The connector extension extends outwardly in a (arcuate) direction generally away from the second connector end. Because the connector 44 is curved, the connector extension 62 may also be slightly curved or may be straight. On the opposite side of the connector, a connector recess 64 is integrally formed as part of the elongated curved connector at the second connector end. The connector recess extends inwardly in a (arcuate) direction generally towards the first connector end.

Importantly, the connector extension 62 of one connector is configured to be inserted into and directly connectable to the connector recess 64 of an adjacent connector in a repeatable manner forming a fixed connection. Again, it will be understood by those skilled in the art that many shapes and sizes of extensions 62 and recesses 64 could be devised, such that this teaching is not limited to just the embodiment shown herein. The plurality of connectors are then used and configured to form two singular and continuous rings. Because the extension 62 and recess 64 are square (rectangular) shaped, when the two parts are mated there is no movement between the parts. In this manner, the extension 62 is designed to fit snugly within the recess 64 for a secure attachment.

To form the self-supporting rigid cylindrical treadwheel 10, the first end of one platform is configured to be disposed adjacent to the second end of an adjacent platform in a repeatable manner where the plurality of platforms are configured to form a singular and continuous cylindrical surface from the plurality of curved surfaces. Then, the plurality of the at least one left side extensions of the plurality of platforms are connectable to the plurality of the at least one platform extension receivers of one of the two singular and continuous rings. Similarly, the plurality of the at least one right side extensions of the plurality of platforms are connectable to the plurality of the at least one platform extension receivers of the other of the two singular and continuous rings. Each singular and continuous ring is directly attachable to the singular and continuous cylindrical surface of the plurality of platforms forming a self-supporting rigid cylindrical treadwheel 10, which is best shown in FIG. 19.

Finally, as with the previous embodiments, a stationary base is configured to rest upon a surface, the stationary base supporting a plurality of rollers. The plurality of rollers are configured to roll against the plurality of curved bottom surfaces allowing the self-supporting rigid cylindrical treadwheel to spin freely when an animal moves upon the singular and continuous cylindrical surface.

Figure 26:
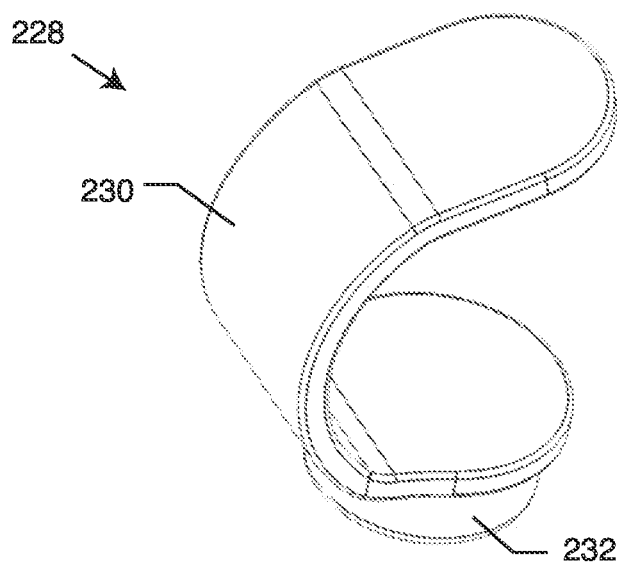
FIG. 26 is a perspective view of a biased lock of the structure of FIG. 19.
Figure 27:
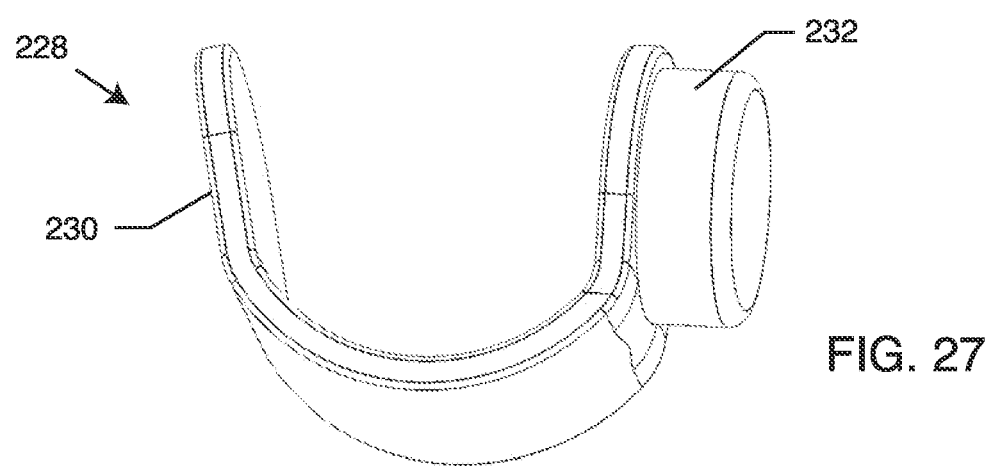
FIG. 27 is another perspective view of the biased lock of FIG. 26.
Figure 28:
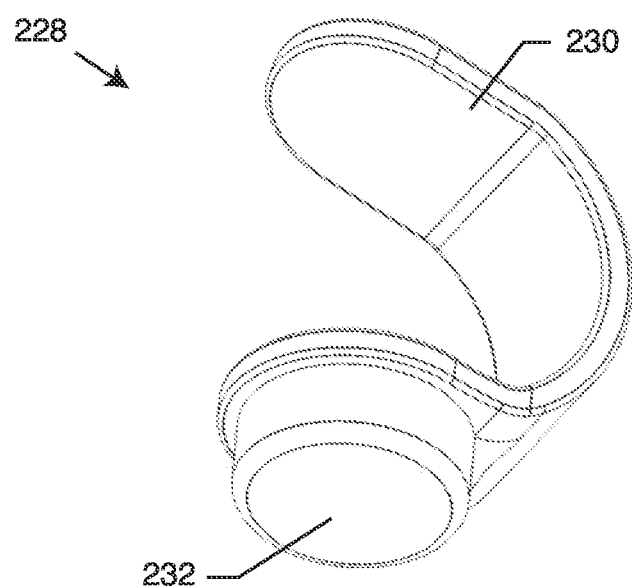
FIG. 28 is another perspective vie of the biased lock of FIG. 26.

To aid in ease of assembly and best shown in FIGS. 26-28, the embodiments herein include a plurality of biased locks 228. The plurality of biased locks 228 are configured to fixedly attach (i.e., lock) the plurality of elongated curved connectors to one another forming the two singular and continuous rings. The plurality of biased locks are also configured to fixedly attach the two singular and continuous rings to the singular and continuous cylindrical surface of the plurality of platforms thereby forming the self-supporting rigid cylindrical treadwheel.

The plurality of biased locks 228 may each be manufactured as a separate part from the plurality of elongated curved connectors and the plurality of platforms. Each biased lock of the plurality of biased locks may comprise a flexural spring portion 230 attached to an extended button 232. The flexural spring portion and extended button may be integrally formed as a single injection molded polymer part. The polymer material chosen has enough internal resiliency such that the flexural spring 230 may be compressed and still bias the extended button 232 outwardly. It will be understood by those skilled in the art that the biased lock 228 may take many shapes and forms and this teaching is not limited to the exact embodiment shown herein. As shown here, the flexural spring portion 230 has a U-shape. However, an O-shape or other shapes could be used that still generate a biasing force to keep the extended button extended outwardly.

Referring back to FIGS. 22-25, the connector extension may comprise an integrally formed first buttonhole 234 and the connector recess may comprise an integrally formed second buttonhole 236. The first and second buttonholes are configured to align together when the connector extension of the one elongated curved connector is inserted into the connector recess of the adjacent elongated curved connector.

Accordingly, at least one of the biased locks 228 of the plurality of biased locks is configured to be disposed within the connector extension. As can be seen in FIGS. 22 and 25, the connector extension is hollow allowing for the biased lock to fit within. Then, the at least one biased lock may fixedly attach two adjacent elongated curved connectors when the extended button 232 is disposed within the aligned first 234 and second buttonholes 236. Similarly, a user can still gain access and depress the top of the button 232 to detach the parts if needed.

As shown in FIGS. 22 and 25, the first and second buttonholes may be disposed along the inside end 48 of each of the plurality of elongated curved connectors. However, it will be understood that the first and second buttonholes could be disposed along any side of the connector 44.

Furthermore, each elongated curved connector may comprise an integrally formed third buttonhole 238 as best seen in FIG. 22. Then, each platform may comprise an integrally formed fourth buttonhole 240 as best seen in 21. In this embodiment, each connector 44 has two of the third buttonholes 238 and each platform 12 has four of the fourth buttonholes 240. The third buttonhole and fourth buttonhole are configured to align together when either of the two singular and continuous rings are attached to the singular and continuous cylindrical surface of the plurality of platforms. Then, at least one of the biased locks 228 of the plurality of biased locks may be configured to fixedly attach the either of the two singular and continuous rings to the singular and continuous cylindrical surface of the plurality of platforms when the extended button 232 is disposed within the aligned third 238 and fourth buttonholes 240.

In this embodiment the biased lock is an injection molded part. However, there are several other ways and methods such a biased lock can be manufactured, as this teaching is not intended to limit it just to the embodiment shown herein. For example, the biased lock may comprise a metallic spring attached to an extended button. The metallic spring can be a flexural spring made of spring steel or be a compression spring.

Furthermore, as another embodiment not shown, each of the plurality of biased locks may be integrally formed as either a part of each elongated curved connector or as a part of each platform, wherein each biased lock comprises a flexural spring portion attached to an extended button. If this was the case, then one of the buttonholes could be eliminated on the same part as the buttonhole on the corresponding other part would be the only buttonhole needed. In other words, for each biased lock, only one biased lock would be needed to engage into one buttonhole on the corresponding attached part.

A lip edge 66 may project from and along the entirety of the curved bottom surface in a direction away from the curved upper surface, wherein the lip edge is configured to be disposed adjacent to the plurality of rollers when the self-supporting rigid cylindrical treadwheel is placed upon the stationary base. The lip edge 66 may be formed aligned with either of the outside end 46 or inside end 48 of the connector 44. The lip edge helps to keep the treadwheel aligned with the rollers when in use as previous described.

A plurality of pads 42 may be configured to attach to the entirety of the curved surface, as previously described.

Again, each platform of the plurality of platforms may consist of a single part of an injection molded plastic, and each elongated curved connector of the plurality of elongated curved connectors may consist of a single part of an injection molded plastic. Similarly, the platform extension 36 may be integrally formed at the first end of each of the plurality of platforms, and the platform recess 38 may be integrally formed at the second end of each of the plurality of platforms. As taught herein, the platform extension of the one platform may be configured to be connectable to the platform recess of the adjacent platform in a repeatable manner.

The connector extension 62 may be configured to assemble and attach into the connector recess 64 in a movement direction that is generally along the arcuate shape of the elongated curved connector. This is different than the previous embodiments where the extension and recess connected in a direction that was perpendicular to this newest embodiment.

Each singular and continuous ring may be configured to assemble and attach to the plurality of platforms in a movement direction that is perpendicular to the left side and right side of the platforms. When formed as the self-supporting rigid cylindrical treadwheel, the abutting ends of the plurality of platforms may be staggered in relation to the abutting ends of the plurality of elongated curved connectors. To help assembly for the user, the connector may have an alignment mark 242 that is to be aligned with a similarly shaped alignment mark 244 on the platform. The alignment mark may be molded into the various structures, or may be made afterwards with a pen, paint or other marking technique such as laser etching or the like.

As can be seen in FIG. 19, the plurality of platforms may consist of eight platforms and the plurality of elongated curved connectors for each of the singular and continuous rings may consist of eight elongated curved connectors. It will be understood by those skilled in the art that any other number of each part may be used and this teaching is not limited herein to this exact embodiment. Therefore, the overall part count of the platforms and connectors have been reduced such that the assembly process has been simplified.

Figure 29:
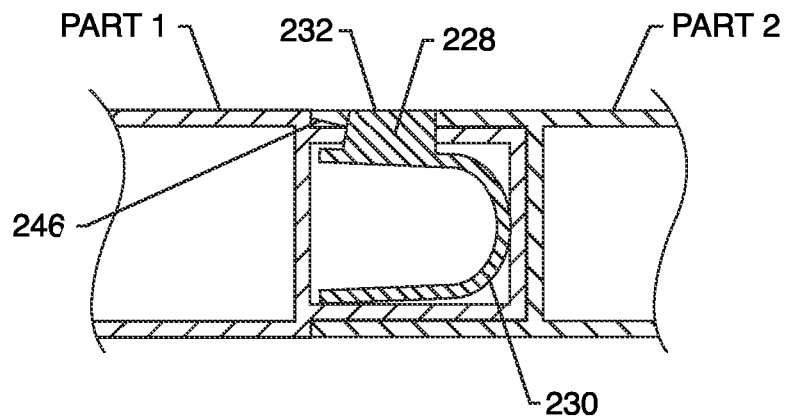
FIG. 29 is a sectional view showing how a biased lock captures two parts together.

Referring now to FIG. 29, this sectional view shows how two parts (Part 1 and Part 2) can be attached through the use of the biased lock 228. Parts 1 and 2 represent the various parts taught herein, specifically the platforms 12 and connectors 44. The biased lock 228 is disposed within a hollow cavity of one of the parts. The extended button 232 is then captured within the two buttonholes, whether the buttonholes are from the platforms or the connectors. The angled surface 246 is used to help the two parts to mate together and depress the button during insertion of one into the other. As can be seen, a user can still easily depress the extended button 232 if the two parts are needed to be separated.

Figure 30:
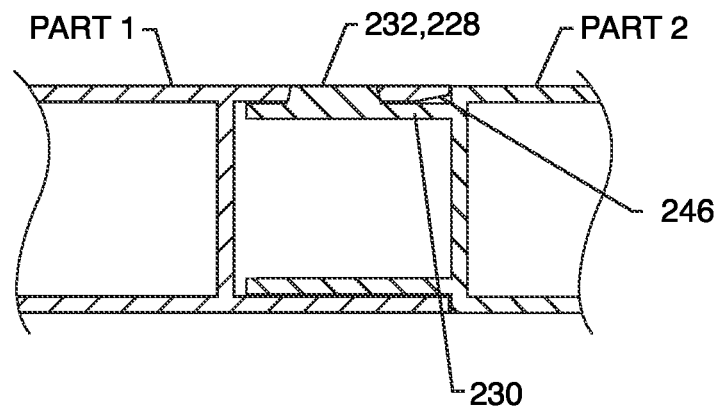
FIG. 30 is a sectional view of another embodiment of how the biased lock can be integrally formed as a part of either the platform or connector.

FIG. 30 is another embodiment of how the biased lock 228 can be integrated into one of the parts. Here, Part 2 has a flexural portion 230 that extends in a cantilevered manner to the extended button head 232. The button head 232 then is able to fit within the buttonhole on the opposite Part 1. Again, a user can simply depress the button head 232 to disassemble the parts. Angled surface 246 helps the two parts mate together during insertion. This embodiment eliminates the biased lock 228 from being a separate part and reduces part count and aids in simplification for ease of assembly, as biased locks 228 can no longer be lost or misplaced.

In summary, this new embodiment is different from the previous embodiments in that the first connector end of one elongated curved connector is fixedly connectable to the second connector end of an adjacent elongate curved connector in a repeatable manner forming a left side and right side self-supporting rigid and continuous ring. This means that the rings are fully connected between each connector 44 such that they will not fall apart and therefore have a good amount of internal support and rigidity. Then, these rings are attached to the plurality of platforms such that they capture and lock each platform into position. This unique structure is easier to assembly and results in a very strong treadwheel 10.

Furthermore, this new embodiment also uses the biased locks 228 which are injection molded parts having the flexural spring portion connected to the extended button. Utilization of the biased locks 228 allows all the parts to simply snap together with great ease and secure fitment that has been a drastic improvement over previous embodiments. Furthermore, it is very easy to detach the parts if necessary. Very little skill and strength is now required to fully assemble and disassemble the animal treadwheel 10.

Although several embodiments have been described in detail for purposes of illustration, various modifications may be made to each without departing from the scope and spirit of the invention. Accordingly, the invention is not to be limited, except as by the appended claims.

What is claimed is:

1. An animal treadwheel assembly, comprising:
   a plurality of platforms, each platform comprising:
     a curved surface opposite a bottom side;
     a first end opposite a second end;
     a left side opposite a right side;
     wherein the first and second ends are connected by the left and the right sides;
     wherein the curved surface is delimited by the first end, the left side, the second end, and the right side;
     a platform extension disposed at the first end;
     a platform recess disposed at the second end, the platform recess having a left side wall and a right side wall;
     a left curved roller surface disposed at the left side facing away from the curved surface;
     a right curved roller surface disposed at the right side facing away from the curved surface;
     wherein the curved surface is concentric in relation to the left curved roller surface and the right curved roller surface about a common center;
     wherein the curved surface is concave; and
     wherein the left curved roller surface and the right curved roller surface are convex;
   wherein the platform extension of one platform of the plurality of platforms is configured to attach to the platform recess of an adjacent platform of the plurality of platforms in a repeatable manner for each platform of the plurality of platforms forming a self-supporting rigid cylindrical animal treadwheel, and wherein the platform extension is captured between the left side wall and the right side wall of the platform recess preventing movement in a left or a right direction between the platform extension within the platform recess;
   the animal treadwheel comprising:
     a singular and continuous cylindrical inner surface formed from the plurality of curved surfaces;
     a singular and continuous cylindrical left outer surface formed from the plurality of left curved roller surfaces; and
     a singular and continuous cylindrical right outer surface formed from the plurality of right curved roller surfaces; and
   a stationary base configured to rest upon a surface, the stationary base supporting a plurality of rollers, where the plurality of rollers are configured to roll against the singular and continuous cylindrical left and right outer surfaces allowing the animal treadwheel to spin freely when an animal moves upon the singular and continuous cylindrical inner surface.

2. The animal treadwheel assembly of claim 1, wherein the platform extension comprises at least one tab configured to lock into at least one aperture disposed at the platform recess.

3. The animal treadwheel assembly of claim 1, wherein the platform recess comprises at least one tab configured to lock into at least one aperture disposed at the platform extension.

4. The animal treadwheel assembly of claim 1, wherein the plurality of platforms attach to one another without the use of auxiliary fasteners.

5. The animal treadwheel assembly of claim 1, including a plurality of pads, each pad of the plurality of pads configured to attach to the singular and continuous cylindrical inner surface in a repeatable manner.

6. The animal treadwheel assembly of claim 1, wherein each platform of the plurality of platforms consists of a single part of an injection molded plastic.

7. The animal treadwheel assembly of claim 1, including a plurality of biased locks, wherein the plurality of biased locks are configured to fixedly attach the platform extension of one platform to the platform recess of an adjacent platform.

8. The animal treadwheel assembly of claim 7, wherein the plurality of biased locks are each manufactured as a separate part from the plurality of platforms.

9. The animal treadwheel assembly of claim 8, wherein each biased lock of the plurality of biased locks comprises a flexural spring portion attached to an extended button.

10. The animal treadwheel assembly of claim 9, wherein the flexural spring portion and extended button are integrally formed as an injection molded polymer part.

11. The animal treadwheel assembly of claim 10, wherein the platform extension comprises an integrally formed first buttonhole and the platform recess comprises an integrally formed second buttonhole, the first and second buttonholes configured to align together when the platform extension of the one platform is inserted into the platform recess of the adjacent platform, wherein at least one biased lock of the plurality of biased locks is configured to lock within the first and second buttonholes.

12. The animal treadwheel assembly of claim 1, wherein the plurality of platforms consist of eighteen platforms.

13. The animal treadwheel assembly of claim 1, wherein the animal treadwheel consists essentially of the plurality of platforms.

14. The animal treadwheel of claim 1, wherein the platform extension disposed at the first end has a platform extension concave surface disposed on the bottom side, and wherein the platform recess disposed at the second end has a platform recess concave surface disposed on the bottom side.

15. A self-supporting, rigid and cylindrical animal treadwheel, comprising:
- a plurality of platforms, each platform comprising:
  - a curved surface opposite a bottom side;
  - a first end opposite a second end;
  - a left side opposite a right side;
  - wherein the first and the second ends are connected by the left and the right sides;
  - wherein the curved surface is delimited by the first end, the left side, the second end, and the right side;
  - a platform extension disposed at the first end;
  - a platform recess disposed at the second end;
  - a left curved roller surface disposed at the left side facing away from the curved surface;
  - a right curved roller surface disposed at the right side facing away from the curved surface;
- wherein the platform extension of one platform of the plurality of platforms is configured to attach to the platform recess of an adjacent platform of the plurality of platforms in a repeatable manner for each platform of the plurality of platforms forming the animal treadwheel;
- wherein the platform extension comprises at least one tab configured to lock into at least one aperture disposed at the platform recess, or, the platform recess comprises the at least one tab configured to lock into the at least one aperture disposed at the platform extension;
- wherein the at least one tab locked into the at least one aperture is configured to restrict movement separating the first end away from the second end of the adjacent platform;
- wherein a singular and continuous cylindrical inner surface is formed from the plurality of curved surfaces;
- wherein a singular and continuous cylindrical left outer surface is formed from the plurality of left curved roller surfaces;
- wherein a singular and continuous cylindrical right outer surface is formed from the plurality of right curved roller surfaces;
- wherein each platform of the plurality of platforms consists of a single part of an injection molded plastic; and
- wherein the animal treadwheel consists essentially of the plurality of platforms where the plurality of platforms attach to one another without the use of auxiliary fasteners.

16. The animal treadwheel of claim 15, wherein the curved surface is concentric in relation to the left curved roller surface and the right curved roller surface about a common center, wherein the curved surface is concave and wherein the left curved roller surface and the right curved roller surface are convex.

17. The animal treadwheel of claim 15, wherein the platform extension disposed at the first end has a platform extension concave surface disposed on the bottom side, wherein the platform recess disposed at the second end has a platform recess concave surface disposed on the bottom side,
wherein the platform extension along the platform extension concave surface comprises the at least one tab configured to lock into the at least one aperture disposed at the platform recess, or, the platform recess along the platform recess concave surface comprises the at least one tab configured to lock into the at least one aperture disposed at the platform extension.

18. A self-supporting, rigid and cylindrical animal treadwheel, comprising:
- a plurality of platforms, wherein each platform of the plurality of platforms consists of a single part of an injection molded plastic, each platform comprising:
  - a concavely curved inside surface concentrically opposite a convexly curved bottom side;
  - a first end opposite a second end;
  - a left side opposite a right side;
  - wherein the first and the second ends are connected by the left and the right sides;
  - wherein the concavely curved inside surface is delimited by the first end, the left side, the second end, and the right side;
  - at least one platform extension disposed at the first end extending outwardly along the first end;
  - at least one platform recess disposed at the second end extending inwardly along the second end;
  - a left curved roller structure disposed adjacent the left side and facing away from the concavely curved inside surface;
  - a right curved roller structure disposed adjacent the right side and facing away from the concavely curved inside surface;
- wherein the at least one platform extension of one platform of the plurality of platforms is configured to attach to the at least one platform recess of an adjacent platform of the plurality of platforms in a repeatable manner for each platform of the plurality of platforms forming the self-supporting, rigid and cylindrical animal treadwheel;
- wherein either the at least one platform extension or the at least one platform recess comprises either an at least one flexural tab or an at least one tab aperture;
- wherein the at least one flexural tab is configured to lock into the at least one tab aperture securing adjacently disposed platforms relative to each other and restricting movement separating the first end away from the second end of connected platforms;
- wherein a singular and continuous cylindrical inner surface is formed from the plurality of concavely curved inside surfaces configured for an animal to move upon;
- wherein a singular and continuous cylindrical left outer structure is formed from the plurality of left curved roller structures configured for at least one left roller wheel to supportively and rotatably engage;
- wherein a singular and continuous cylindrical right outer structure is formed from the plurality of right curved roller structures configured for at least one right roller wheel to supportively and rotatably engage; and
- wherein the self-supporting, rigid and cylindrical animal treadwheel consists essentially of the plurality of platforms where the plurality of platforms attach to one another without the use of auxiliary fasteners.

* * * * *